United States Patent [19]

Motoyama et al.

[11] Patent Number: 5,535,318

[45] Date of Patent: *Jul. 9, 1996

[54] DEBUGGING SYSTEM FOR A HIERARCHICALLY STRUCTURED PAGE DESCRIPTION LANGUAGE

[75] Inventors: Tetsuro Motoyama; Yueh-Lin Chang, both of San Jose, Calif.

[73] Assignees: Ricoh Company, Ltd., Tokyo, Japan; Ricoh Corporation, San Jose, Calif.

[ * ] Notice: The term of this patent shall not extend beyond the expiration date of Pat. No. 5,446,837.

[21] Appl. No.: 180,015

[22] Filed: Jan. 11, 1994

Related U.S. Application Data

[63] Continuation-in-part of Ser. No. 146,724, Nov. 2, 1993, Pat. No. 5,422,992, and a continuation-in-part of Ser. No. 119, 930, Sep. 10, 1993, Pat. No. 5,446,837, each is a continuation-in-part of Ser. No. 87,571, Jul. 2, 1993, which is a continuation-in-part of Ser. No. 931,808, Aug. 11, 1992, Pat. No. 5,416,896, which is a continuation-in-part of Ser. No. 876,601, Apr. 30, 1992, Pat. No. 5,319,748, and a continuation-in-part of Ser. No. 876,251, Apr. 30, 1992, Pat. No. 5,325,484.

[51] Int. Cl.$^6$ .................................................. G06F 11/32
[52] U.S. Cl. .................................................. 395/145
[58] Field of Search .................................. 395/145, 147; 364/578

[56] References Cited

U.S. PATENT DOCUMENTS

| | | | |
|---|---|---|---|
| 4,953,084 | 8/1990 | Meloy et al. | 395/700 |
| 5,124,989 | 6/1992 | Padawer et al. | 371/19 |
| 5,265,254 | 11/1993 | Blasciak et al. | 395/700 |
| 5,333,246 | 7/1994 | Nagasaka | 395/145 X |
| 5,353,388 | 10/1994 | Motoyama | 395/117 |
| 5,361,351 | 11/1994 | Lenkov et al. | 395/700 |
| 5,371,747 | 12/1994 | Brooks et al. | 371/19 |
| 5,379,373 | 1/1995 | Hayashi et al. | 395/145 X |
| 5,394,544 | 2/1995 | Motoyama et al. | 395/575 |

OTHER PUBLICATIONS

Adobe, Post Script Language Reference Manual, 1990, pp. 1–99, 378–379, 620–623.
Borland, Turbo Debuggar Version 2.0 User's Guide, 1990, pp. 12–19, 115–117, 191–209, 232–233, 266–269.
Roth, Real World PostScript, 1988, pp. 17–46.
Tennent, principles of Programming Languages, 1981, pp. 14–21, 64–73, 95–146.
ISO/IEC DIS 10180, Information Processing–Text Communication–Standard Page Description Language; Draft International Standard 1991–03, 1991.

Primary Examiner—Heather R. Herndon
Assistant Examiner—Anton W. Fetting
Attorney, Agent, or Firm—Oblon, Spivak, McClelland, Maier & Neustadt

[57] ABSTRACT

A method and apparatus for debugging a hierarchically structure page description language document. As a hierarchically structured page description language is being processed, a picture/pageset stack is used to keep track of the different hierarchical levels of the document. A prologue data structure is used to keep track of various system parameters at each hierarchical level and a current context of interpretation data structure is used to keep track of system parameters as a content portion of the document is being processed. During the debugging operations, system function debugging commands can be entered which pertain to setting and deleting break points and processing of the document by the system and debugger. There are also display function debugging commands which allow a user to display any of the system parameters using the system information stored in the data structures used by the system.

16 Claims, 20 Drawing Sheets

```
unix:/std/chang> spdl font2.doc
SPDL input filename is: font2doc
PS2 driver output filename is designated to: font2.doc.ps2
line# 1 <!DOCTYPE SPDL PUBLIC "ISO/IEC 10180/DTD
         Standardized Page Description Language//EN">
(debug) set at 10
[1] break at line 10
(debug) set at 5
[2] break at line 5
(debug) set at 15
[3] break at line 15
(debug) display break point table
[3] stop at 15
[2] stop at 5
[1] stop at 10
(debug) go
line# 2 <SPDL>
line# 3   <PICTURE CONTREP = "ISO/IEC 10180//content::spdl-clear-text">
line# 4     <PROLOGUE>
line# 5       <RESDEFN RESCLID = "FONT">
(debug) go
line# 6         <ENVRSID NOTATION = "PUBID">
line# 7           ISO/IEC 10180//fonts::iso-serif::regular
line# 8         </ENVRSID>
line# 9         <FNTRSPC>
line# 10          <FONTRFR>
(debug) go
line# 11          <FNTRSID NOTATION = "PUBID">
line# 12            ISO/IEC 10180//fonts::iso-serif::regular
line# 13          </FNTRSID>
line# 14          <REQATTR>
line# 15          <FNTPROP>
(debug)
```

DOCUMENT = PAGESET

Pageset —50
　　Prologue —51
　　　　Resource Definition —52
　　　　　　Tokensequence —53
　　　　Dictionary Generator —54
　　　　　　Tokensequence —55
　　　　Dictionary Generator —56
　　　　　　Tokensequence —57
　　　　Setup Procedure —58
　　　　　　Tokensequence —59
　　PagesetBody —60
　　　　Picture —61
　　　　　　Prologue —62
　　　　　　　　Context Declaration —63
　　　　　　　　　　Dictionary Identifier —64
　　　　　　　　Dictionary Generator —65
　　　　　　　　　　Tokensequence —66
　　　　　　　　Setup Procedure —67
　　　　　　　　　　Tokensequence —68
　　　　　　PictureBody —69
　　　　　　　　Tokensequence —70
　　　　　　　　Picture —71
　　　　　　　　　　PictureBody —72
　　　　　　　　　　　　Tokensequence —73
　　　　　　　　Tokensequence —74
　　　　Picture —75
　　　　　　PictureBody —76
　　　　　　　　Tokensequence —77

*FIG. 3*

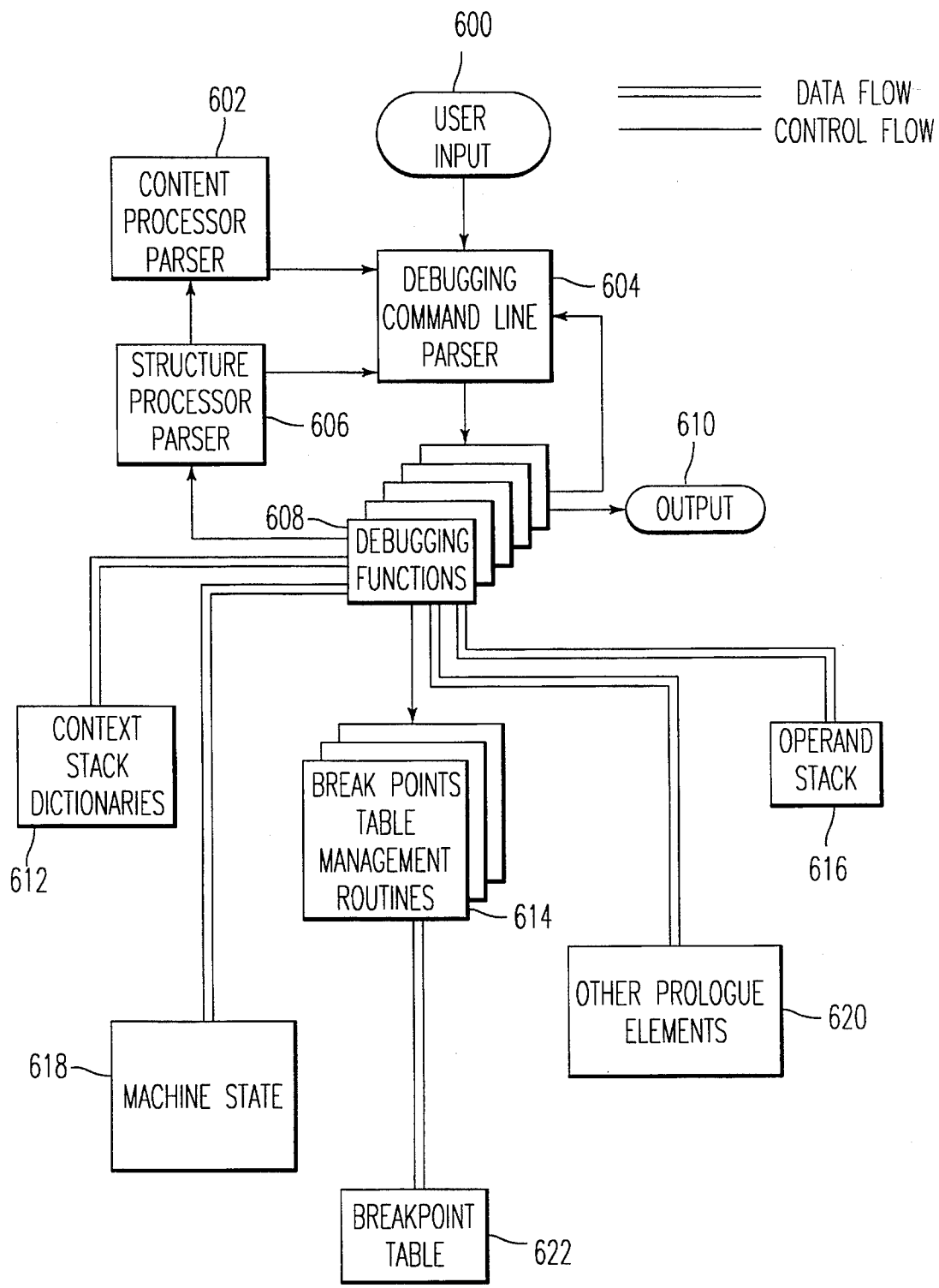

```
unix:/std/chang> spdl font2.doc
SPDL input filename is: font2doc
PS2 driver output filename is designated to: font2.doc.ps2
line# 1 <1DOCTYPE SPDL PUBLIC "ISO/IEC 10180/DTD
        Standardized Page Description Language//EN">
(debug) set at 10
[1] break at line 10
(debug) set at 5
[2] break at line 5
(debug) set at 15
[3] break at line 15
(debug) display break point table
[3] stop at 15
[2] stop at 5
[1] stop at 10
(debug) go
line# 2 <SPDL>
line# 3 <PICTURE CONTREP = "ISO/IEC 10180//content::spdl-clear-text">
line# 4     <PROLOGUE>
line# 5         <RESDEFN RESCLID = "FONT">
(debug) go
line# 6         <ENVRSID NOTATION = "PUBID">
line# 7           ISO/IEC 10180//fonts::iso-serif::regular
line# 8         </ENVRSID>
line# 9         <FNTRSPC>
line# 10           <FONTRFR>
(debug) go
line# 11           <FNTRSID NOTATION = "PUBID">
line# 12             ISO/IEC 10180//fonts::iso-serif::regular
line# 13           </FNTRSID>
line# 14           <REQATTR>
line# 15             <FNTPROP>
(debug)
```

*FIG. 16*

DEBUGGING SYSTEM FOR A HIERARCHICALLY STRUCTURED PAGE DESCRIPTION LANGUAGE

CROSS-REFERENCES TO RELATED APPLICATIONS

This application is a continuation-in-part of U.S. patent application Ser. No. 08/146,724 (now U.S. Pat. No. 5,422,992) filed on Nov. 2, 1993, and entitled "Method and System to Handle State Variables in a Document Processing Language", and U.S. patent application Ser. No. 08/119,930 (now U.S. Pat. No. 5,446,837) filed on Sep. 10, 1993, and entitled "Method and System to Process Resources in a Document Processing Language", both of which are continuations-in-part of U.S. patent application Ser. No. 08/087,571 filed on Jul. 2, 1993, and entitled "Method and System to Handle Context of Interpretation in a Document Processing Language which is a continuation-in-part of U.S. patent application Ser. No. 07/931,808 (now U.S. Pat. No. 5,416,896) filed on Aug. 11, 1992 and entitled "A Method And System to Handle Dictionary Generation and Context Declaration in a Document Processing Language" which is a continuation-in-part of U.S. patent application Ser. Nos. 07/876,601 (now U.S. Pat. No. 5,319,748) and 07/876,251 (now U.S. Pat. No. 5,325,484) both filed on Apr. 30, 1992 and entitled "Method and Apparatus to Manage Picture and Pageset for Document Processing" and "Method and System to Handle Inclusion of External Files into a Document Processing Language," respectively, each of which is incorporated herein by reference.

BACKGROUND OF THE INVENTION

1. Field of the Invention

This invention relates generally to the computer control printing, displaying, or other presentation of documents which may have text, graphical components, and/or images. This invention is more particularly related to a method and system for processing the beginning and ending of pictures or pagesets in a document data stream, keeping track of the status of the presentation device referred to as the state of the virtual machine using a set of dictionaries, defined later, a context stack defining the search order of the dictionaries, a state variable table, a set of resources, and an operand stack.

This invention is even more particularly related to debugging a system which is processing a hierarchically structured document.

2. Discussion of the Background

The development of laser printers in the early 1970s provided an opportunity for high quality, low cost printing of documents, which contained not only character text but also general graphical material. The primary method of controlling commands by the computer to the printer employed the so called "escape sequence" commands, similar to the type of commands used in the DIABLO® command sequence. These types of commands were distinguished from typical character data by preceding each command with a special byte, generally an escape character (ASCII 27). This methodology works acceptably with daisy wheel or dot matrix printers but is not well suited for printing documents that might have changing requirements. For example, as needs change and as technology improves, an upgrade of the presentation device is necessary. This type of upgrade in the past would have required removal of the program controller of conventional presentation devices. At a minimum, a new PROM containing instructions for the printer would be required. This is not a commercially acceptable way of handling temporary changes, as a new PROM would be installed for a few print jobs, and would then have to be replaced with the original PROM or another new PROM. This method of upgrade is wasteful and results in many failures of the presentation device controller.

As a response to the limitations inherent in the escape sequence commands, different types of "page description language" (PDL) were developed generally to control laser printers or other types of page printers. Backward compatibility of these laser printers was provided by way of an ability to accept escape sequence commands. Two current examples of page description language are the PostScript® system from Adobe Systems Incorporated and InterPress® from Xerox® Corporation. Several other proprietary PDLs are also known.

Some of the prior art page description languages provided various improvements to the standard escape sequences known previously, such as by providing tools and syntax for manipulation of objects, or by providing for the use of operand stacks or the like. Moreover, there are stack-oriented programming languages. These languages also allowed, in some cases, for dynamic changes in the printer's state, such as the ability to add fonts or graphical images to the resources that might be available to the printer. Some of these features are documented in such generally available reference works as Adobe System Incorporated's "PostScript Language Reference Manual" and the "PostScript Language Program Design," both by Addison-Wesley Publishing Company (1985 and 1988, respectively). Other PDLs are also described in various technical and reference books such as "InterPress, The Source Book" by Harrington et al. (Simon and Schuster, Inc., 1988)

A standardized page description language (SPDL) has been proposed and is being developed as an international standard by the International Organization for Standardization ("ISO"). The proposal, to which one of the present inventors is a contributor, is currently in draft form before a section of the ISO. The draft is known as ISO/IEC DIS 10180, labeled "Information Processing Text-Communication Standard Page Description Language" and is available through the American National Standards Institute ("ANSI") in New York.

As SPDL is a new document processing language, there are no commercially available systems at the present time which can process a hierarchically structured document encoded in SPDL. To assist the present inventors in developing a system to process an SPDL document, they found it desirable to have a debugger which would allow them to monitor an SPDL processing system which they were developing.

A commercially available debugging tool for use in the PostScript page description language is LaserTalk from Adobe. However, PostScript is not a structured language like SPDL and therefore, LaserTalk does not handle the debugging of any structure portions as is performed by the present invention. In addition, Laser Talk requires a workstation connected to a PostScript printer through a bi-directional communiction channel.

SUMMARY OF THE INVENTION

Accordingly, one object of this invention to provide a method and apparatus which can keep track of the scope and status of material defined within a document data stream in an efficient manner.

It is a further object of this invention to have a debugging system for a system which processes a hierarchically structured page description language.

These and other objects are achieved according to the present invention by providing an efficient method of processing a page description language as defined in ISO/IEC DIS 10180, (hereinafter DIS 10180) for example. According to DIS 10180, as currently constituted, each document data stream is provided in a structure which is either a pageset or picture. The pageset and picture elements consist of an optional prologue which contains definitions and declaratory commands and an optional body. A pageset body consists of zero or more pagesets or pictures while a picture body consists of zero or more pictures or tokensequences. The tokensequence which contains specific tokens or commands for defining specific images along with necessary operators contains "content" while other elements in the document are called "structure". The structure sets up the environment for content to generate the appropriate output images. The effects of a prologue within the hierarchical level of a picture or pageset is until the end of that picture or pageset. Therefore, the prologue of a picture in the hierarchical structure of a document does not influence those structures at the same or peer level or superior structures while influencing structures at a lower hierarchical level. This invention effectively handles this hierarchical tree structure along with the scope of the prologue by using a stack and various pointers.

A tree-linked hierarchical structure advantageously enables the processing of any portion of the document by directly addressing that portion of the document and those portions which are higher in the hierarchy without the necessity of processing any other items in different branches of the hierarchical tree. In other words, only structural definitions which occur in the hierarchical tree which are above a given portion of the document need be processed. This increases the efficiency of the processing of the document and also facilitates the determination of the type of resources which will be needed in the printing device or the display device prior to the commencement of the actual printing of the document. This increases the speed and efficiency by which various devices print or display the document.

Whenever a hierarchical level in a document is being processed, an entry is pushed into a picture/pageset stack corresponding to that hierarchical level. Each entry in the picture/pageset stack has a pointer to a prologue data structure and a pointer to a current context of interpretation (hereinafter called "CCI") data structure. The CCI data structure is used whenever content of a document is being processed. The entries in the CCI data structure can be modified when the structure of a document or file is being processed and can also be modified as content is being processed. However, content cannot directly modify the entries in the picture/pageset prologue data structure.

When an SPDL document is being processed and the debugger of the present invention is being used, when a structure parser or content parser encounters a new line control character such as a line feed or a line feed with a carriage return, the debugging routines of the present invention are called. The debugger allows debugging functions such as setting break points, deleting break points, single step tracing as a document is being processed, processing the document until a break point is encountered, executing a predetermined number of lines, and displaying the break points in a document. The present invention allows the displaying of parameters used by the document processing system such as displaying of the operand stack, context stack, dictionaries, state variables, defined resources, declared resources, values in dictionaries, and structure level such as a picture level and a pageset level at a current position of the document.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 illustrates the structure of an exemplary two page SPDL document;

FIG. 15 is a functional block diagram of the debugging system of the present invention;

FIG. 16 illustrates an example of the operation of the present invention;

DETAILED DESCRIPTION OF THE DRAWINGS

Figure 1A:
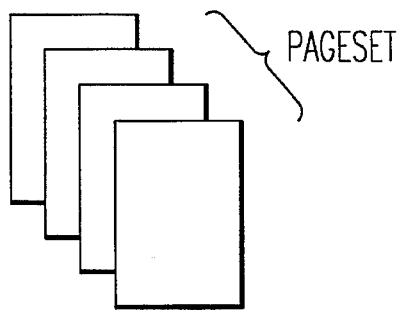
FIG. 1A and 1B are illustrations of sample documents and their hierarchical structural elements.
Figure 1B:
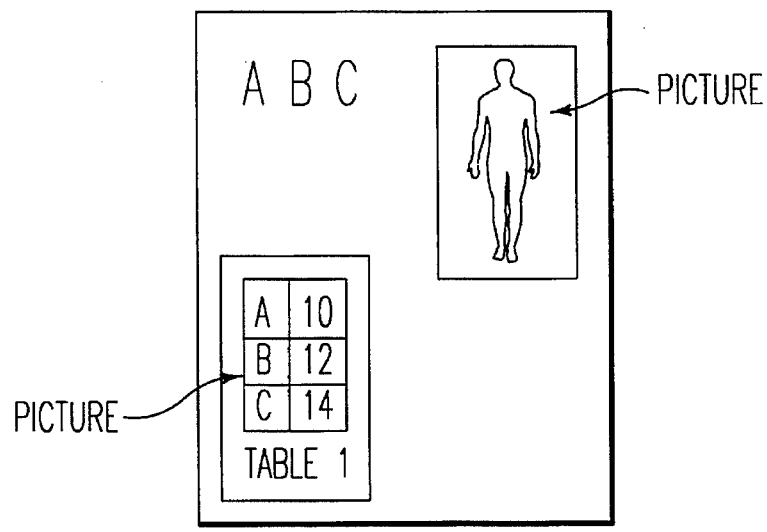

Referring now to the drawings, wherein like reference numerals designate identical or corresponding parts throughout the several views, and more particularly to FIGS. 1A and 1B thereof, there are illustrated two documents and their structural elements such as pictures and pagesets as defined in the Standard Page Description Language ("SPDL"). In SPDL, a document can be defined as a single picture or a single pageset. A pageset can consist of additional pagesets or pictures. A picture cannot be greater than one page and cannot cross from one page to another. FIG. 1A illustrates a document consisting of one pageset with four pages (the highest level of pictures). FIG. 1B illustrates a single page document containing text and two pictures. The document of FIG. 1B could be represented as either a pageset of one page or a picture as it is only one page.

Figure 2:
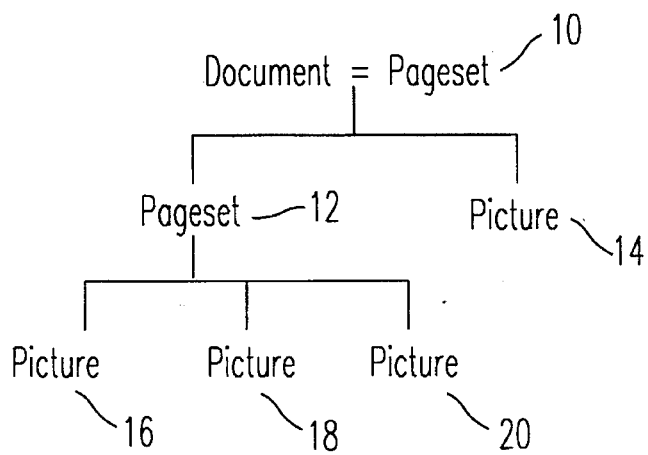
FIG. 2 is an illustration of the hierarchical structure of a document.

FIG. 2 is an illustration of the hierarchical structure of an SPDL document. The document illustrated in FIG. 2 contains a pageset 10 as its highest hierarchical structural element. Pageset 10 consists of pageset 12 and picture 14. Pageset 12 further consists of the pictures 16, 18, and 20. To define hierarchical levels by way of example, pageset 12 is at a lower hierarchical level than pageset 10 but at a higher hierarchical than the pictures (pages) 16, 18, or 20. Each hierarchical element will usually consist of a lower level hierarchical element and/or one or more tokensequence elements. A tokensequence is a special type of structural element which contains content. Content is the substance of what is printed or displayed for a document. A tokensequence, for example, may describe a drawing, text or image. The representation of content such as a drawing, text, or image by way of tokensequences allows for a very rapid and efficient processing of a document for presentation, especially when only a portion of a document is to be presented because the tokensequences of pages which are not to be presented do not have to be processed. Pictures 14, 16, 18 and 20 each will probably have at least one tokensequence element.

FIG. 3 is a detailed illustration of the structure elements of a sample two page document. The document consists of one pageset 50 having a prologue 51 and a pagesetbody 60. A prologue is an optional structural element which defines various parameters for a picture or pageset. The prologue 51 contains four subordinates; resource definition 52, dictionary generator 54, dictionary generator 56, and setup procedure 58, and corresponding tokensequences. The resource definition 52 is a structural element which indicates tokensequence 53 contains the content which defines resources used for presentation (e.g., the definition of a form used by a document).

The dictionary generator 54 indicates that tokensequence 55 defines a dictionary. Similarly, dictionary generator 56 indicates that tokensequence 57 defines a dictionary. A dictionary definition contains ordered pairs consisting of a key and a value. Whenever a key is encountered in content, the value from a dictionary corresponding to the key is substituted therefor. The value entry in a dictionary can be an integer number, a real number, procedure or any other type of value. Dictionaries created by dictionary generators are made read only and are created to be context dictionaries, as explained below.

The setup procedure 58 initializes various state variables which are used when processing content. Exemplary state variables are variables such as Current_Color, Current_Font and Current_Position. The setup procedure is also used to alter the contents of the user dictionary, if desired. The user dictionary is a read/write dictionary which is searched after the context and content dictionaries are searched without encountering the searched key.

Pageset body 60 contains two pages having pictures 61 and 75. Picture 61 has its own prologue 62 which defines parameters only for the picture 61 and does not affect picture 75. Prologue 62 contains context declaration 63 and its dictionary identifier 64, dictionary generator 65 its tokensequence 66, setup procedure 67, and its tokensequence 68. The picturebody 69 of picture 61 contains tokensequences 70 and 74, and picture 71 having picturebody 72 and tokensequence 73. The second page of the document has picture 75 with picturebody 76 having tokensequence 77.

The context declaration 63 indicates a manipulation of context dictionaries which are defined in higher hierarchical levels of the structure. If a dictionary identifier such as dictionary identifier 64 follows a context declaration, the dictionary identifier will indicate how the search order of the context dictionaries are to be changed. If a dictionary identifier element does not follow the context declaration, any defined search order of the dictionaries will be eliminated, no context dictionaries will be searched for the particular hierarchical level, and the user dictionary and the system dictionary will be placed in the bottom of the context stack. The search order of the dictionaries is defined using context dictionary stack data structures, as will be explained in detail below.

It should be understood that FIG. 3 illustrates only an abstract description of the structure of an SPDL document and an actual SPDL document might use a different description.

Before giving a detailed description of the debugging operation of the present invention, it is necessary to understand how the system parameters for the hierarchical levels are stored. Each time a new hierarchical level (e.g., a picture or pageset structure element) an entry is placed on the picture/pageset stack 202 illustrated in FIG. 4. Each entry in the picture/pageset stack contains a pointer or reference to a prologue data structure and a pointer or reference to a current context of interpretation ("CCI") data structure.

For example, the second entry 204 on the picture/pageset stack 202 contains a pointer to prologue data structure 206 and a pointer to CCI data structure 208. The pointer to the prologue data structure 206 points to the picture/pageset prologue data structure 220, hereinafter referred to as a prologue data structure. The pointer to CCI data structure 208 points to the CCI data structure 240. The entry 210 at the bottom level of stack 202 has a pointer to prologue data structure 212 which points to a higher hierarchical level prologue data structure (not illustrated) and a pointer to a CCI data structure 214 which points to null.

The prologue data structure allows each hierarchical level to have its own set of system parameters. When a subsequent hierarchical level is processed, that subsequent level has its own prologue data structure initially having the values of the prologue data structure of the immediately superior hierarchical level. In this manner, the higher hierarchical levels are not affected by the lower hierarchical levels.

The CCI data structures are created and used when processing content portions (tokensequence elements) of a document. The entries in the CCI data structure have corresponding entries in the prologue data structure and upon encountering a content portion of the document, a CCI data structure is created having the same values as the corresponding portions of the prologue data structure. For example, the pointer to resource declaration 242 corresponds to pointer 226 in the prologue data structure, the pointer to context stack 244 corresponds to the pointer to context declaration 227, the pointer to operand stack 246 does not have a corresponding entry in the prologue data structure as the operand stack is used only when processing content, the pointer to state variable table 248 corresponds to pointer 229, the pointer to machine state 250 corresponds to pointer 230, and the pointer to user dictionary link 252 corresponds to pointer 231.

In the prologue data structure 220, the pageset_level 221 and the picture_level 222 are used to keep track of the current pageset and picture hierarchical levels in the document.

Figure 5:
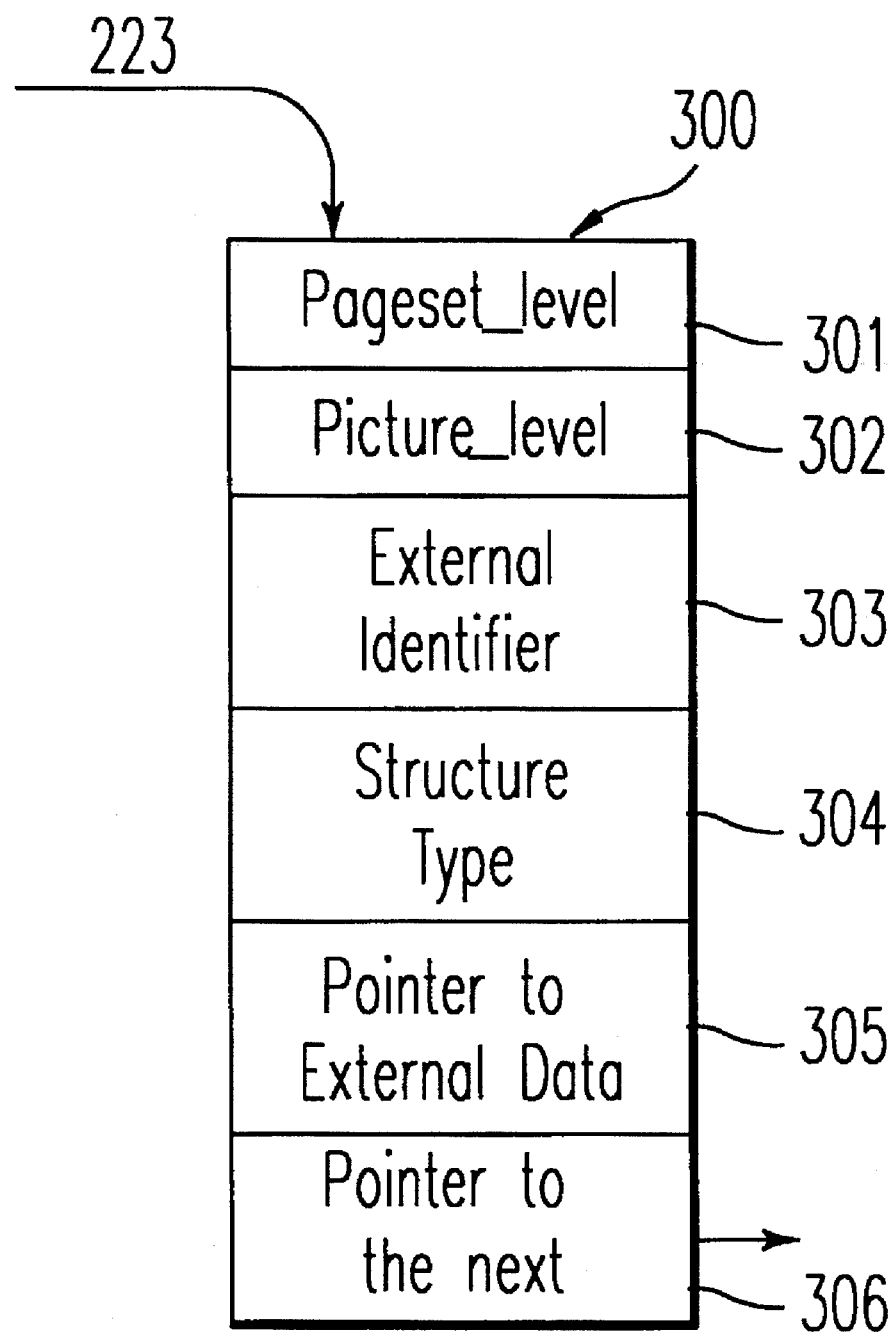
FIG. 5 illustrates an external declaration data structure pointed to by the prologue data structure.

SPDL allows for the inclusion of external entities into a document. An external entity might be, for example, a graph, an image, or another document. The pointer to external declaration 223 points to an external declaration data structure 300 illustrated in FIG. 5. The external declaration data structure contains the pageset level 301 and picture level 302 at which the external declaration data structure was created. An identifier 303 naming the external declaration, a structure type 304 defining the type of external declaration (e.g., graphics), a pointer to external data 305 which contains the actual information defining the external declaration, and a pointer to a next external declaration data structure 306.

It is possible to have a plurality of external declarations in a document. Therefore, a plurality of external declaration data structures may be needed whereas the prologue data structure has only one pointer to an external declaration. Therefore, each external declaration data structure has a pointer to a next external declaration data structure which points to null when there are no subsequent external declaration data structures. When a new external declaration is encountered, a new external declaration data structure is created and pointed to by the pointer to external declaration 223 and the "next" pointer of the newly created external declaration data structure points to the previously existing external declaration data structure. This type of processing for additional external declarations is similar to the processing of the other elements in the prologue data structure and CCI data structure which use linked list data structures similar to the external declaration data structure.

Figure 4:
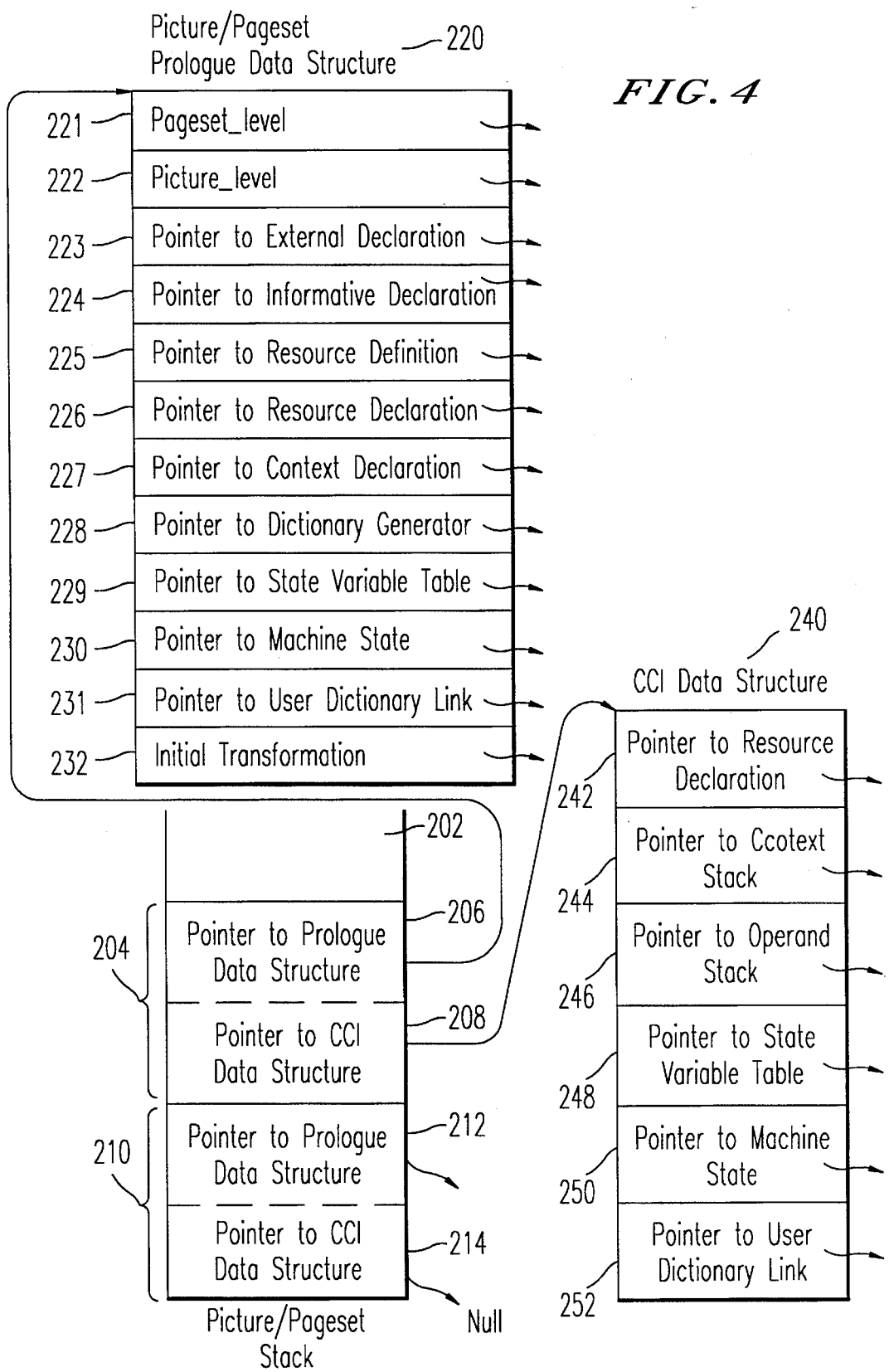
FIG. 4 is an illustration of the picture/pageset stack, and the picture/pageset prologue data structure and CCI data structure pointed to by the entries in the picture/pageset stack.
Figure 6:
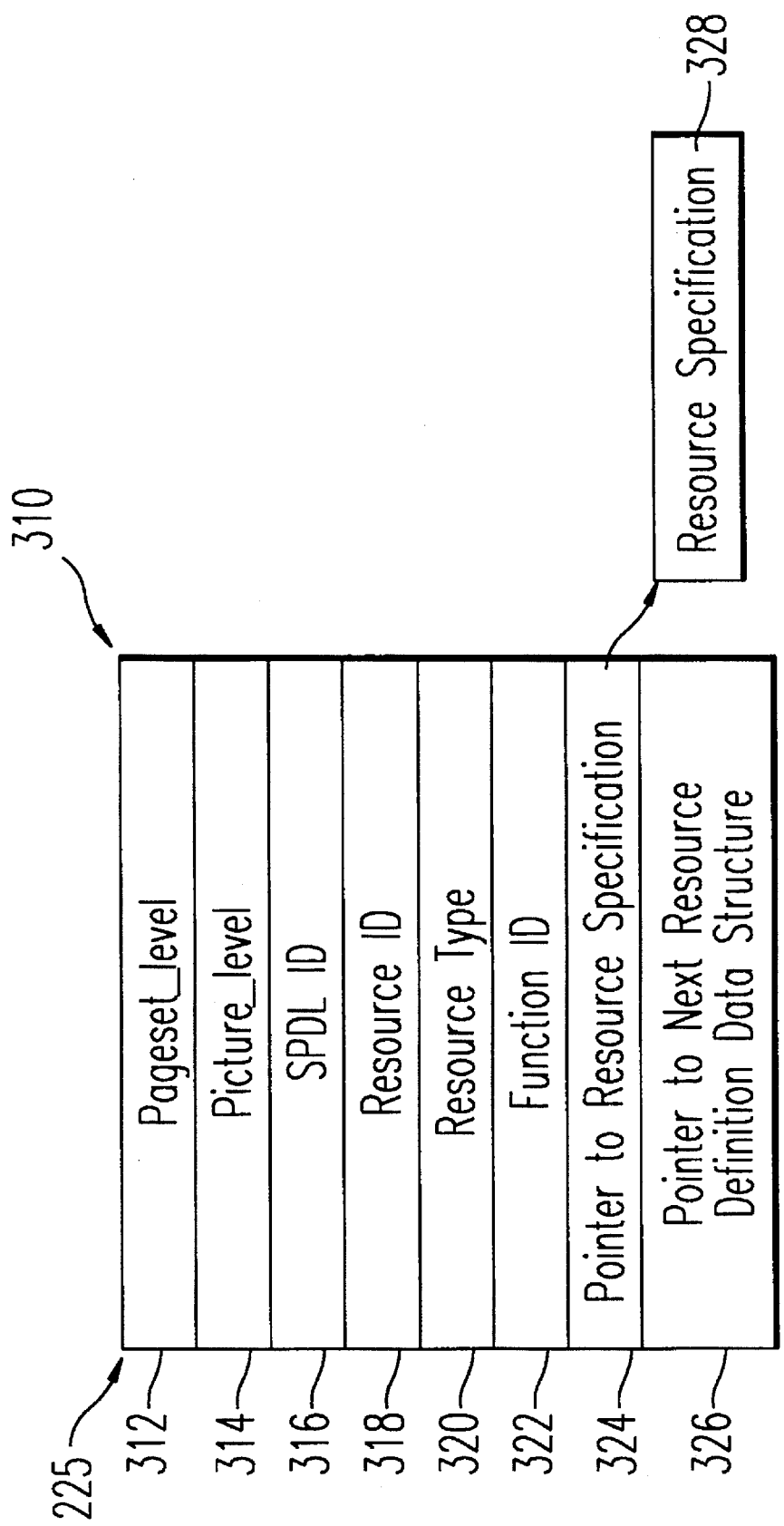
FIG. 6 illustrates a resource definition data structure.

The pointer to resource definition 225 of the prologue data structure 220 in FIG. 4 can point to a resource definition data structure 310 as illustrated in FIG. 6. The resource definition data structure 310 contains entries pageset_level 312 and picture_level 314. The pageset_level 312 and picture_level 314 indicate the pageset hierarchical level and picture hierarchical level at which a resource was defined. When the pageset_level or picture_level ends, the hierarchical structure of SPDL permits the resource definition data structure to be deleted.

Entry 316 of the resource definition data structure contains the SPDL ID. The SPDL ID 316 indicates that the resource definition data structure 310 defines an SPDL resource. Resource ID 318 contains the name of the resource being defined. Resource type 320 indicates the type of resource being defined. Exemplary resource types permitted by SPDL, at the time of this writing, include font object, glyph index map, font index map, color space, data source, filter, pattern and form. Other resource types contemplated in this invention allow for other resource types to be added.

Function ID 322 contains the function identifier as required by SPDL. The function ID shall be "DEFINE" if a resource is being defined or "UNDEFINE" if the resource is being deleted.

The pointer to resource specification 324 points to resource specification 328. The resource specification 328 contains the information which actually defines or describes the resource. A detailed description of the resource specification is not necessary for an understanding of the present invention. However, the resource specification, in this preferred embodiment, conforms to known SPDL requirements.

The pointer to resource definition data structure 326 points to a resource definition data structure having the same structure as resource definition data structure 310. This allows a plurality of resource definition commands to be used within an SPDL document. After the first resource definition data structure is defined, new resource definition data structures are pointed to directly by the prologue data structure and the pointer to next resource definition data structure 116 of the new resource definition data structure will point to the previously created resource definition data structure.

After a resource is defined, it is necessary to declare the resource available for use. This is accomplished by the resource declaration data structure illustrated in FIG. 7. Resources which can be declared are resources which have been defined using a resource definition data structure. It is also possible to declare resources which have been downloaded to the system.

Figure 7:
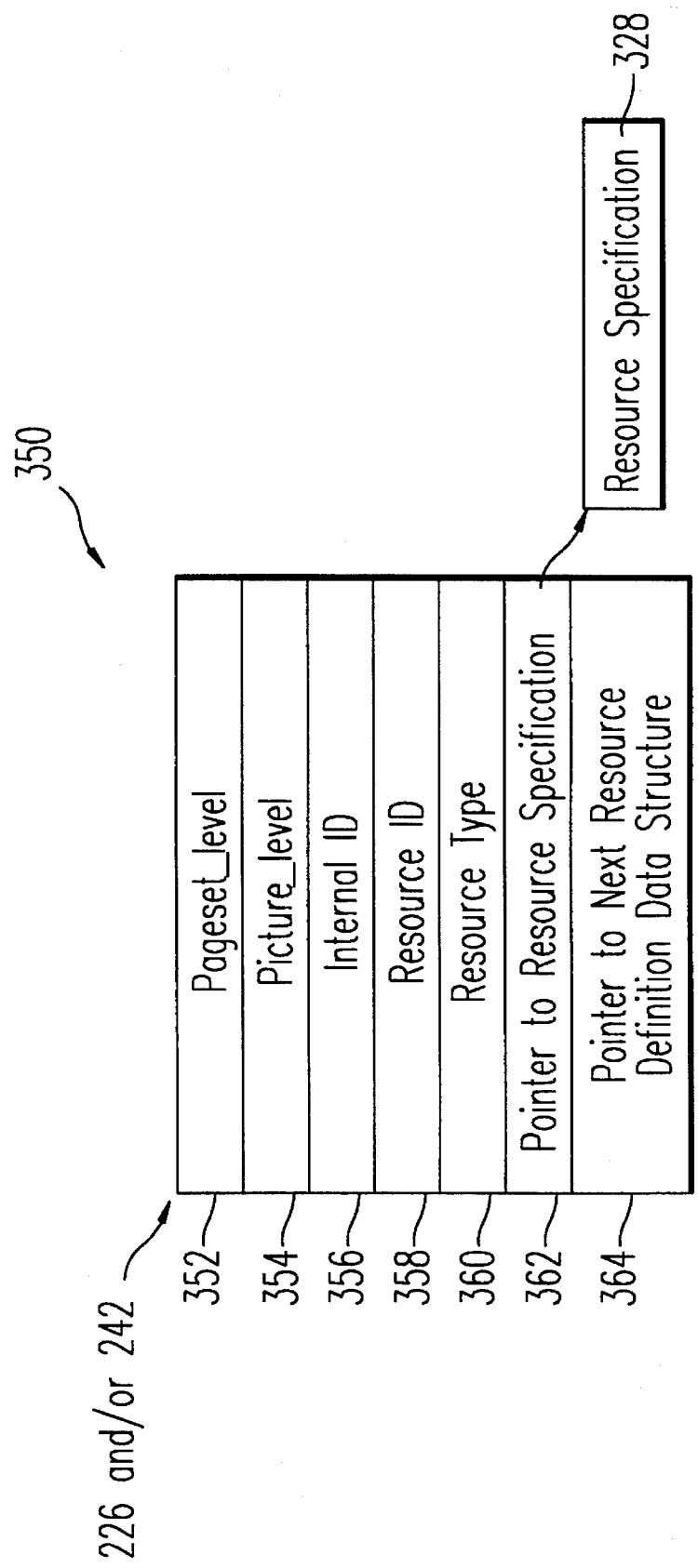
FIG. 7 illustrates a resource declaration data structure.

The resource declaration data structure 350 illustrated in FIG. 7 is used to keep track of declared resources. After a resource is defined by a resource definition command within an SPDL document, it must be declared before it can be used, by issuing a resource declaration command. The resource declaration data structure 350 can be pointed to by the pointer to resource declaration 226 of the prologue data structure 220 and/or the pointer to resource declaration 242 of the CCI data structure 240. The resource declaration data structure 350 contains pageset_level 352 and picture_level 354 indicating the pageset level and picture level at which the resource was declared.

An internal ID 356 is used by the content such as a tokensequence within an SPDL document to identify the resource. The resource ID 358 and the resource type 360 are used to identify the resource specification 328 pointed to by a previously created resource definition data structure. The pointer to resource specification 362 points to the resource specification 328 and the pointer to next resource declaration data structure 364 points to a subsequent resource declaration data structure, if any, or else points to null.

As an SPDL document is being processed, four types of dictionaries are used to look up values and procedures used by the document; a system dictionary, a user dictionary, context dictionaries, and content dictionaries which are created by tokensequences. A dictionary is a set of ordered pairs of objects corresponding to keys and values. Whenever a key is encountered in the SPDL content of a document, the value in the dictionary is substituted therefor. The value portion of a dictionary can be any type of value such as an integer, real, procedure, or any other type of object.

The system dictionary contains all the operators of SPDL content in the key field and corresponding procedures in the value field. For example, when "add" is encountered in the SPDL content, the value corresponding to add is looked up in the system dictionary and the procedure corresponding to add indicates two values are popped from the operand stack, their types are checked, they are added, and the result is pushed back into the operand stack. The system dictionary is not modifiable by the user or SPDL document and is part of the system which processes the SPDL documents.

The next type of dictionary is a user dictionary. The user dictionary is initially empty but can have entries added and modified by tokensequence elements. Not only can information be written into it, but once it is written, it can be changed by the user. It is the dictionary in which the entries are user modifiable (e.g. the dictionaries are read/write dictionaries) and which the user does not need to create using the operator 'dict'. The values in a user dictionary can be any type of value and include integers, reals, and procedures. Conceptually, there is only one user dictionary. However, if one hierarchical level requires a modified user dictionary, whereas other levels do not use the modified dictionary, the system will be required to store different values for the same key for the different hierarchical levels and therefore, there will be different entries in the user dictionary for the different hierarchical levels.

The next type of dictionary is a context dictionary. Whereas there is only one system dictionary and one user dictionary, there can be many context dictionaries for each hierarchical level and within a hierarchical level. The context dictionaries are read-only dictionaries. That is, once the context dictionaries have been defined, they cannot be modified by a user. The context dictionaries are created by tokensequences under a dictionary generator structure element. A further explanation of generation of context dictionaries can be found in commonly owned co-pending U.S. patent application Ser. No. 07/931,808, filed on Aug. 11, 1992, entitled "Method and System to Handle Dictionary Generator and Context Declaration in Standard Page Description Language" and the disclosure of which is incorporated by reference herein.

The last type of dictionary is a content dictionary which is a user defined dictionary and defined by the tokensequence element. The content dictionary is a read/write dictionary when created and is valid only within the scope of the most immediately superior structure element.

Figure 12:
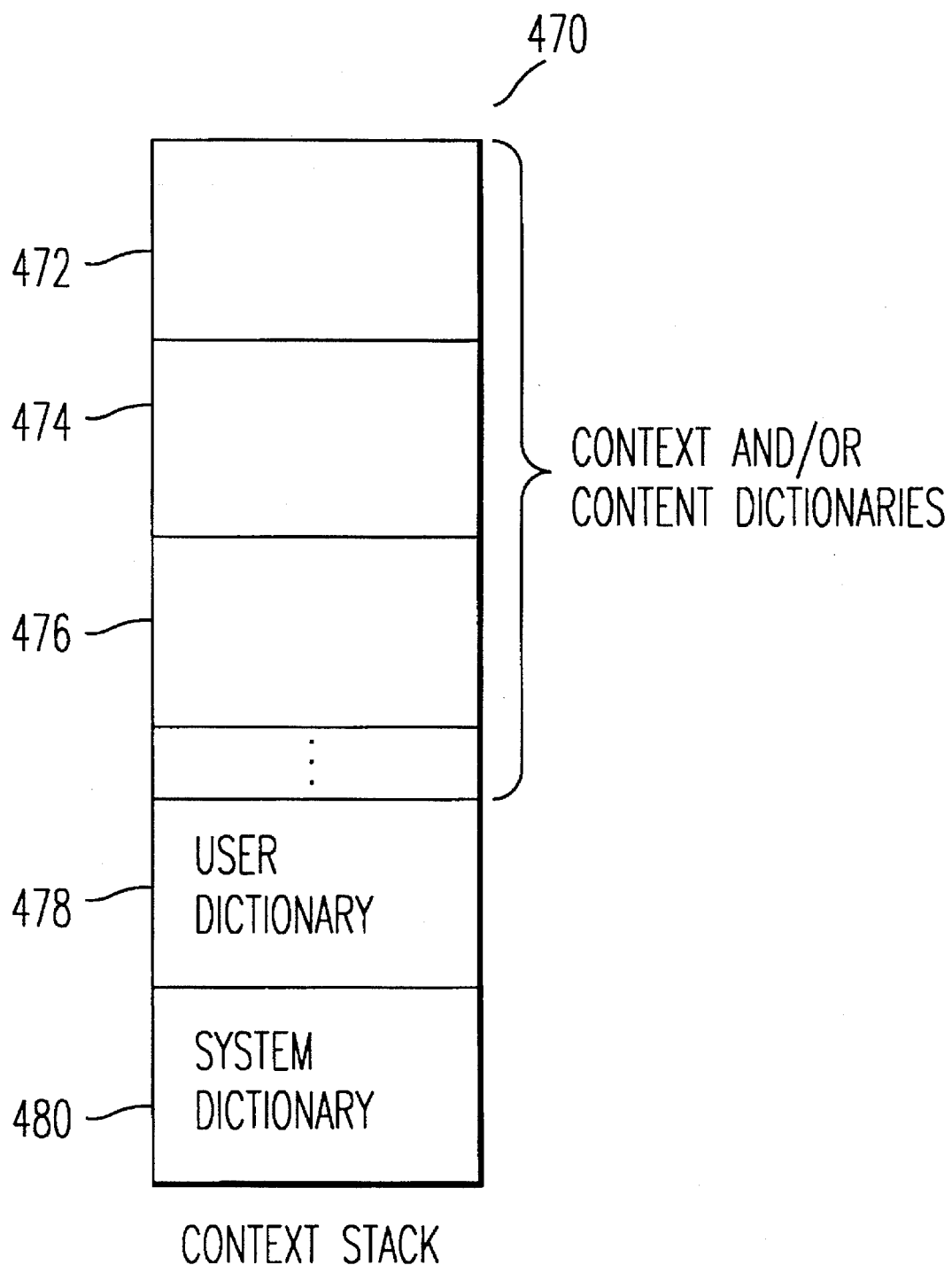
FIG. 12 is an illustration of the context stack.

It is possible that keys in dictionaries being searched can be found in any of the various dictionaries. Therefore, there is a search order employed by the present invention to search the various dictionaries for the keys and defined by what will be referred to as "the context stack", as illustrated in FIG. 12. The context stack is searched from the top. The context and content dictionaries are the first dictionaries to be searched. The user dictionary is the next to the bottom and the system dictionary is at the bottom of the stack. There are ways to modify the makeup of the context stack by pushing the user dictionary and system dictionary to the top.

When a key is searched for in the dictionaries, first the pointer to the context stack in the CCI data structure is examined to determine the context and content dictionaries to be searched. If the key is not found in the context or content dictionaries pointed to by the context stack link data structures, explained below, the user dictionary is searched by examining the pointer to the user dictionary link structure in the CCI data structure to determine if the key exists in the user dictionary. If the key is not found in any of the context or content dictionaries, or the user dictionary, the system dictionary is then searched. It is not necessary to have a pointer to the system dictionary in the prologue data structure or CCI data structure as there is only one system dictionary and the system dictionary is not modified. The system dictionary can always be found in the same location and therefore, there is no need to keep track of the location of the system dictionary for the various hierarchical levels of the document.

The context stack is referred to as a stack which defines the search order of the four types of dictionaries. However, the context stack is not a stack in the conventional sense of the term. The term context stack is used to simplify the explanation of the search order requirements for the dictionaries. In the context stack, the bottom entry is always the same and points to the address of the system dictionary. The next highest entry in the context stack are the user dictionary link structures which correspond to the pointer 231 or pointer 252 in the picture/pageset prologue data structure and CCI data structure, respectively. It is possible for the user dictionary link structure to point to subsequent user dictionary link structures. The highest entries in the context stack are the context and content dictionaries pointed to by context stack link data structures. As the pointer to the user dictionary link structure, a middle element in the context stack, can be modified and used to change entries in the user dictionary without affecting the context and content dictionary search order which is higher in the context stack, the term "context stack" is not necessarily a conventional stack but a conceptual stack-like structure.

Turning now to the various dictionaries used by the CCI data structures and picture/pageset prologue data structures used when processing a document, there are three levels of dictionaries. At the highest dictionary level are the context dictionaries and content dictionaries which are user defined dictionaries by tokensequences. The context dictionaries are read-only dictionaries. Therefore, once they are created, they cannot be modified. Context dictionaries are only used at the hierarchical level in which they are created. Context and content dictionaries are at the highest dictionary level, and therefore are searched first when a key is encountered. If the key is found in one of the context or content dictionaries, no further searching of the dictionaries is necessary. If the key is not found in the context or content dictionaries, the user dictionary is next searched for the key. If the key is not found in the user dictionary, the system dictionary is searched last.

Figure 9:
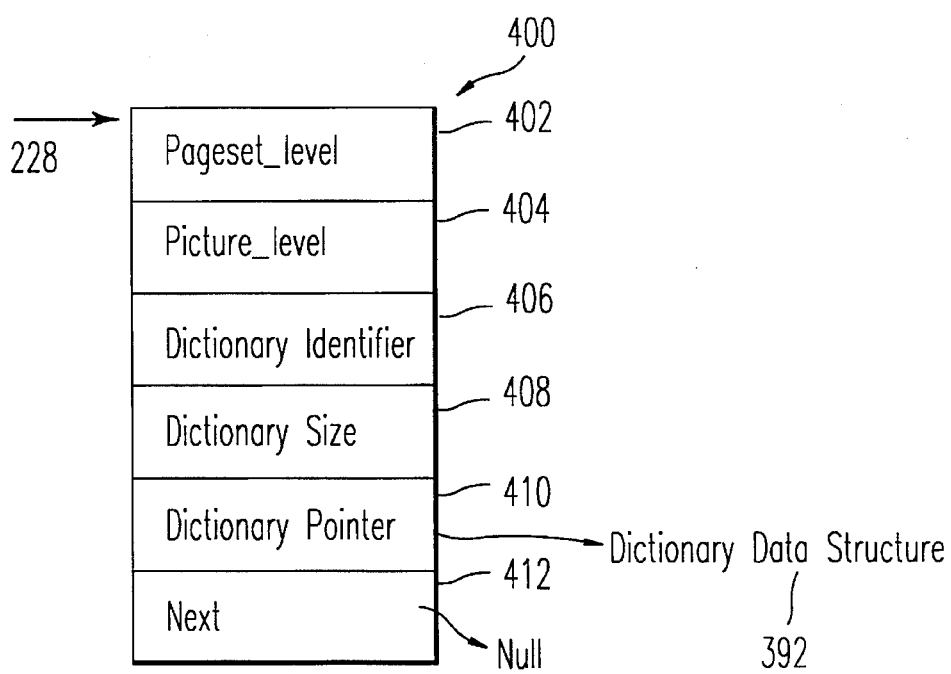
FIG. 9 illustrates a context dictionary generator data structure.

Before an explanation is given of the handling of the context and content dictionaries and the search order thereof, a brief description of the generation process of context dictionaries will be given. When a dictionary generator structure element such as dictionary generator 54 of the document illustrated in FIG. 3 is encountered, the tokensequence 55 under the dictionary generator will define a dictionary to be generated and the structure processor labels the dictionary a context dictionary and creates a context dictionary generator data structure 400, as illustrated in FIG. 9. The context dictionary generator data structure is a linked list containing information pertaining to the pageset_level 402, the picture_level 404, a dictionary identifier 406 corresponding to the name of the dictionary, the dictionary size 408, the pointer to the dictionary data structure 410, and a pointer to a next dictionary generator 412. The pointer 228 to the dictionary generator data structure is found in the picture/pageset prologue data structure 220 of FIG. 4.

The entry "next" 412 in a newly created dictionary generator data structure will point to a previously created dictionary generator data structure if more than one context dictionary is created. This is because newly created dictionary generator data structures are inserted before previously created dictionary generator data structures and not after them.

Figure 8:
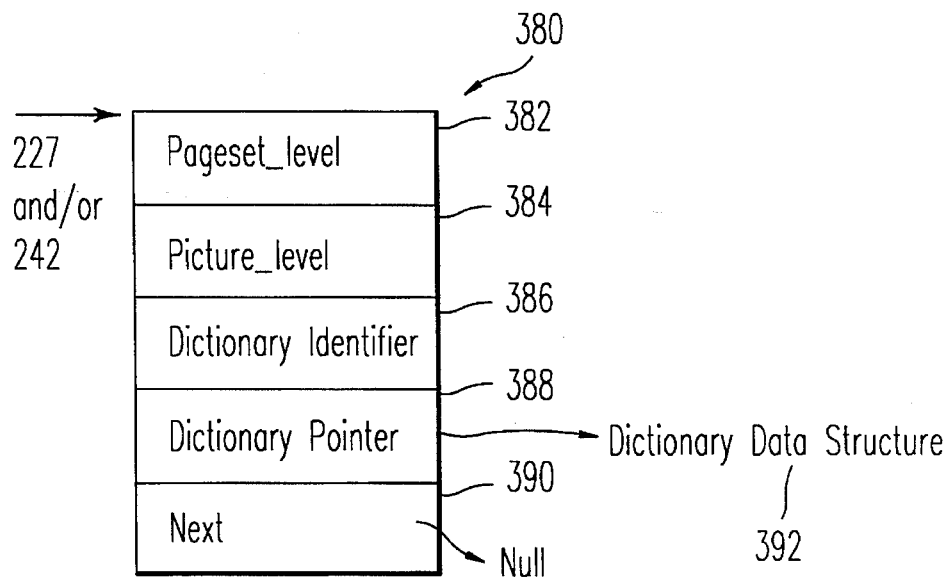
FIG. 8 illustrates a context stack link data structure.

After a context dictionary has been created by a dictionary generator, it is put on the top of the context stack using a context stack link data structure. The search order of the context and content dictionaries can be modified. A context declaration defines or modifies the search order of context dictionaries. Also, there are operators in tokensequences which can manipulate the context stack. The search order for the context dictionaries is defined by the context stack link data structures, an example of which is illustrated in FIG. 8. A context stack link data structure 680, is pointed to by pointer to context declaration 227 of picture/pageset prologue data structure 220 and/or pointer to context stack 242 of CCI data structure 240 illustrated in FIG. 4. The pointer to context declaration and the pointer to the context stack, while having different names, serve similar purposes and will be identical upon the initial creation of the CCI data structure and will have the same basic structure such as that illustrated in FIG. 8.

The context stack link data structure contains pageset_level 382 and picture_level 384, e.g. the levels at which the data structure was created, a dictionary identifier 386 which is the name of the dictionary, a pointer to the dictionary 388 which contains the address of the dictionary data structure 392, and an entry "next" 390 which points to either null or another context stack link data structure. If there are more than one context dictionary in the context stack, entry "next" 390 will point to a context stack link data structure for a subsequent dictionary. A more complete description of the context stack link data structure of FIG. 8 can be found in, commonly owned, co-pending U.S. patent application Ser. No. 07/931,808, entitled "Method and System to Handle Dictionary Generator and Context Declaration in Standard Page Description Language" filed on Aug. 11, 1992, which is incorporated by reference.

Figure 10:
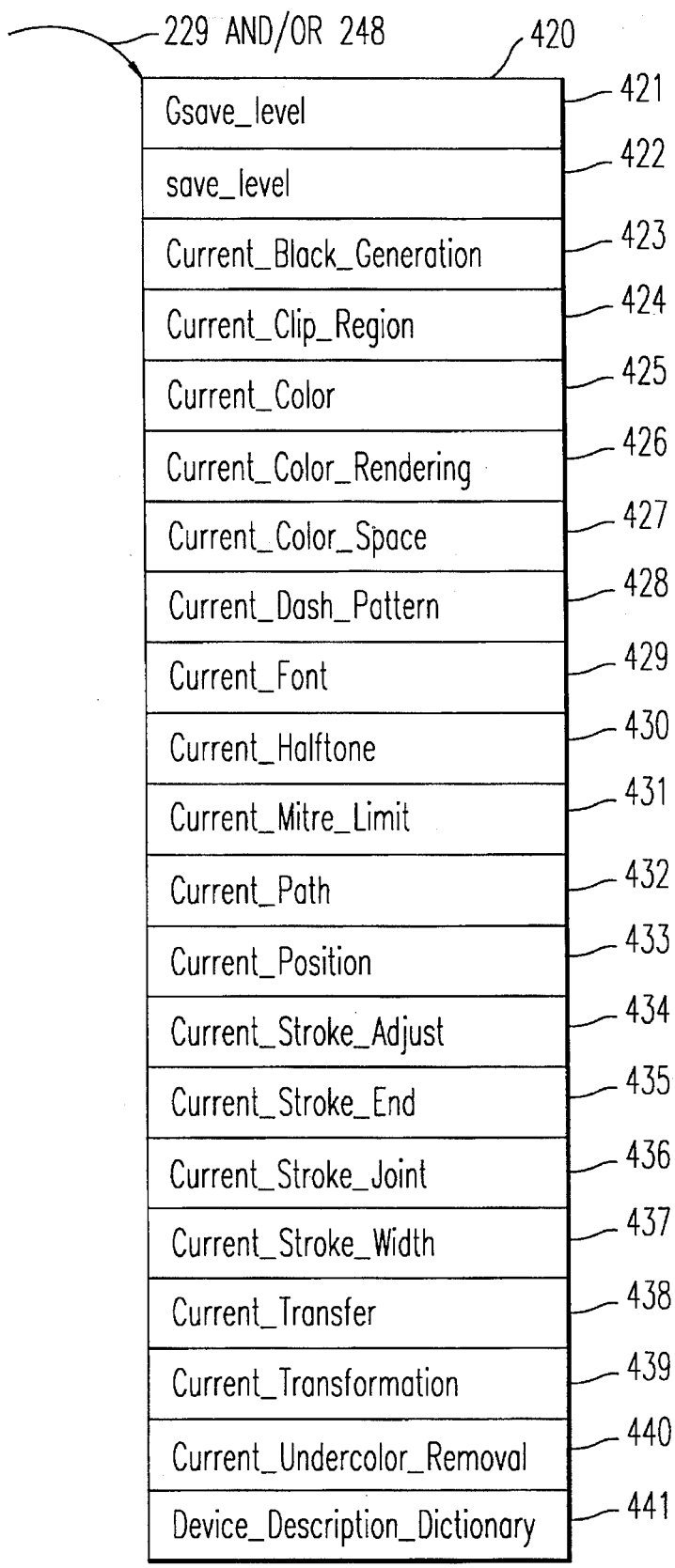
FIG. 10 is an illustration of a state variable table.

The pointer to state variable table 229 in the prologue data structure 220 illustrated in FIG. 4 points to a state variable table such as state variable 420 illustrated in FIG. 10. The state variables in this table are used to define various parameters including graphics variables used for the processing of content. Actual implementations of the present invention may likely contain more state variables than those illustrated in the state variable table of FIG. 10.

Figure 11:
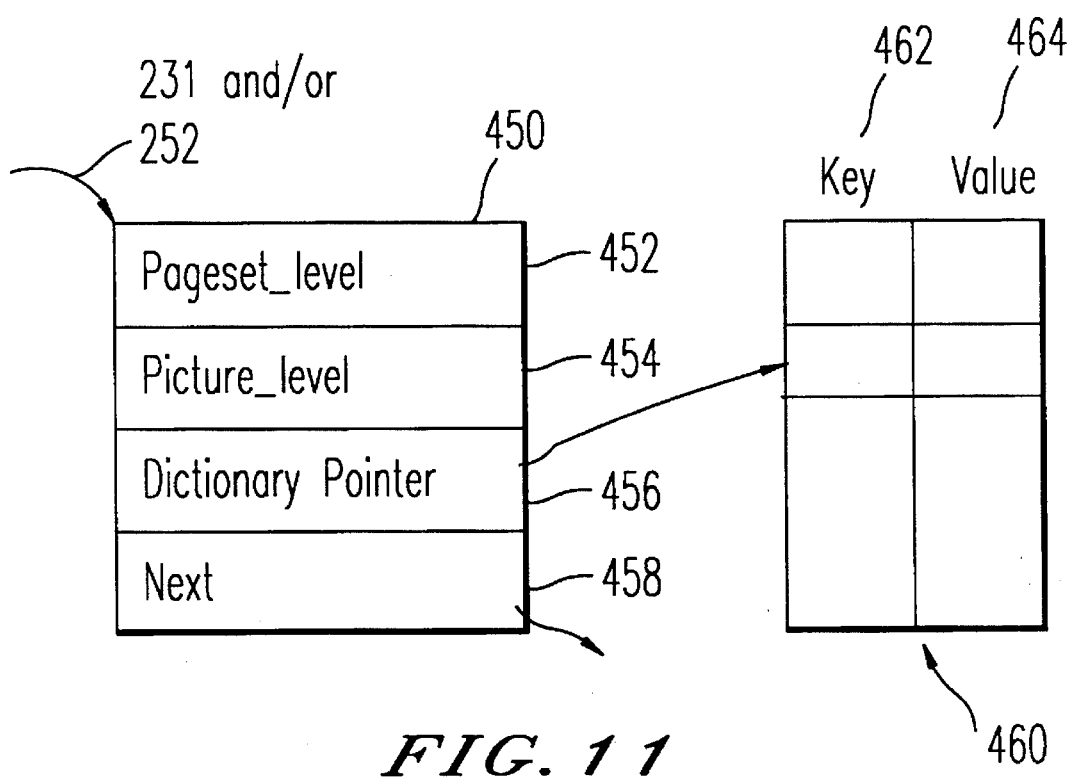
FIG. 11 is an illustration of a user dictionary link data structure.

The user dictionary link structure 450 illustrated in FIG. 11 is pointed to by the pointer to user dictionary link 231 of the prologue data structure 220 of FIG. 8 and/or the pointer to user dictionary link 252 of the CCI data structure. The user dictionary link data structure contains a pageset_level 452, a picture_level 454, a pointer to a user dictionary 456, and an entry "next" 458 which points to either another user dictionary link structure or to null. The user dictionary, for example 460, is similar to the context dictionaries and system dictionary in that it has two columns; a key column 462 and a value column 464. The user dictionary can be modified by any tokensequence and may have entries placed therein by a setup procedure, for example, setup procedure 58 having tokensequence 59 within prologue 51 of FIG. 3.

The pointer to machine state 230 in the prologue data structure points to a data structure which keeps track of the state of the virtual machine processing SPDL document. The initial transform 232 in the prologue data structure 220 keeps track of the transformation, if any of the particular hierarchical level.

As previously described, when a content portion of a document is being processed, a CCI data structure is created having the values therein copied from the prologue data structure (except for the pointer to operand stack 246). As the content portion is being processed, the data structures pointed to by the CCI data structure can be manipulated and modified. When the content portion of the document is finished being processed, the CCI data structure 240 and corresponding data structures can be deleted and therefore, the values referred to by the pointers in the prologue data structure 220 are not modified. A more detailed description of the operation of the CCI data structure can be found in commonly owned co-pending U.S. patent application Ser. No. 08/146,724 filed Nov. 2, 1993, and entitled "Method and System to Handle State Variables in a Document Processing Language", which is incorporated herein by reference.

Figure 13:
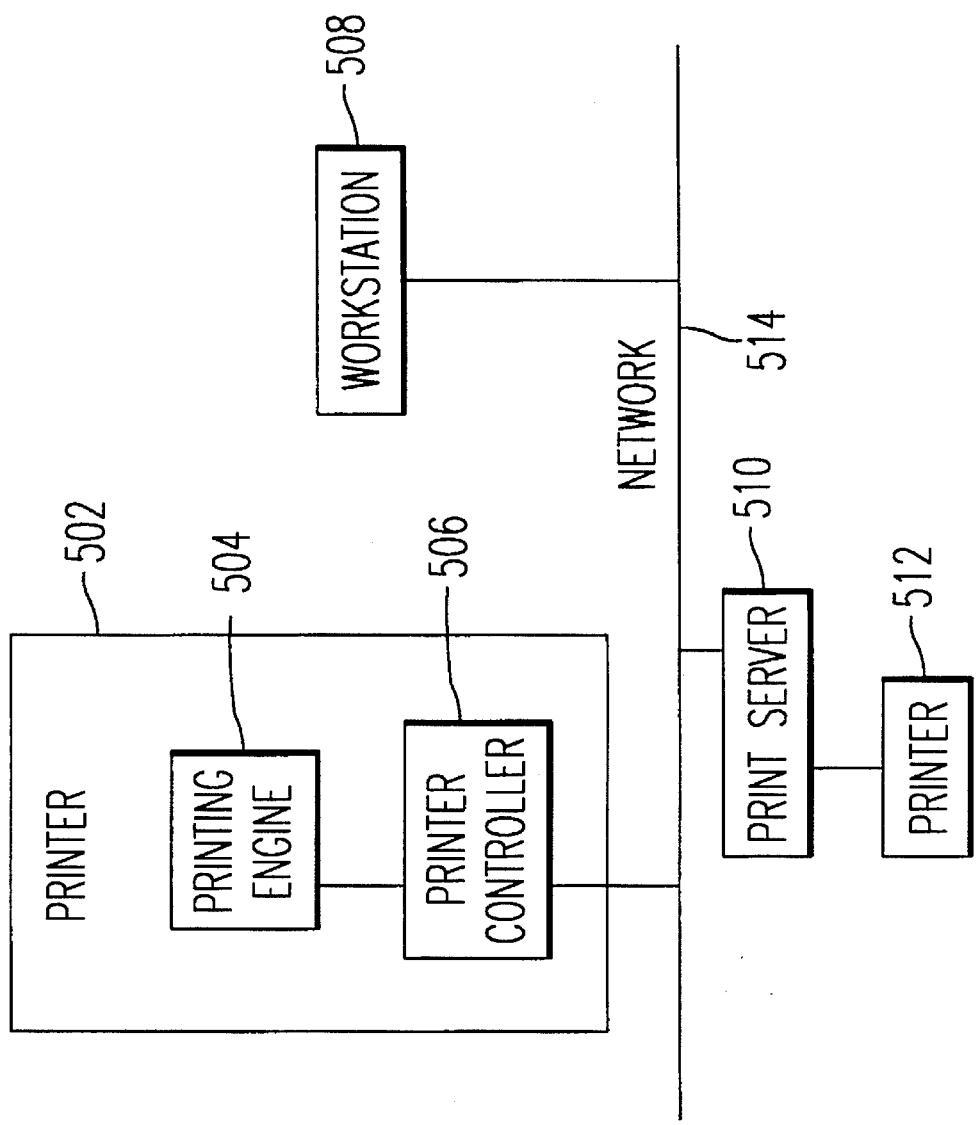
FIG. 13 is an exemplary hardware embodiment of the invention.

FIG. 13 illustrates a network and various devices connected thereto, any of which can employ the present invention. Connected to the network 514 is a printer 502 having a printer controller 506 and a printing engine 504. Workstation 508 is also connected to the network along with print server 510 connected to printer 512.

Figure 14:
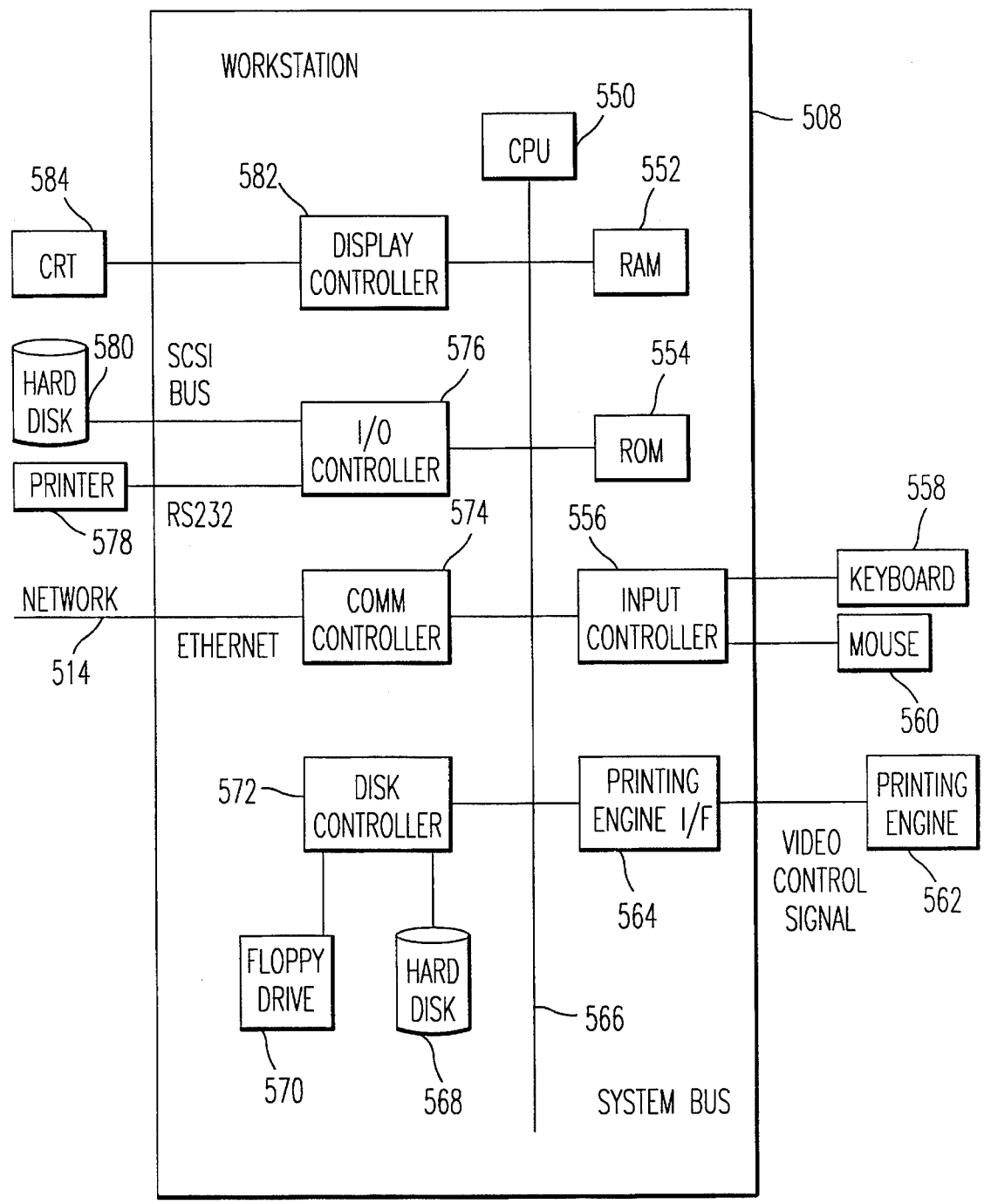
FIG. 14 is a detailed illustration of the workstation illustrated in FIG. 13.

FIG. 14 illustrates the makeup of workstation 508. Workstation 508 contains CPU 550, RAM 552, ROM 554, input controller 556 connected to a keyboard 558 and a mouse 560. A printing engine interface 564 is connected directly to a printing engine 562 which receives video and control signals for rasterized image data transmitted by the printer engine interface 564. The workstation further contains a disk controller 572 connected to a hard disk 568 and floppy drive 570, a communication controller 574 for connection to the network 514 which can be for example an Ethernet® network, an I/O controller 576 connected to an external hard disk 580 through a SCSI bus, for example, and a printer 578 connected through an RS-232 cable, for example. The workstation also contains a display controller 582 connected to a CRT 584. A system bus 566 connects the element within the workstation. A computer program embodying the present invention can be stored in any of the storage devices illustrated in FIG. 14.

An SPDL file to be processed and printed can be directly created by workstation 508 or can be first created by workstation 508 an then stored in either of the hard disks 568 or 580, the floppy drive 570 or the RAM 552, for example. The SPDL file can then be processed for printing by the CPU 550 by processing the SPDL file into rasterized image data which is sent through bus 566 through printer engine interface 564 and finally to printing engine 562 in the form of video and control signals so the image data can be printed on printing engine 562. The debugging processes can also be executed by the CPU 550.

The print server 510 can have a basic makeup similar to the workstation 508. Note that it is possible for an SPDL document which is processed to be converted to other printer languages such as PostScript, or any other printer language.

FIG. 15 illustrates a conceptual system diagram of an SPDL processing and debugging device. The user input 600 to the system can include both an SPDL document and interactive debugging commands. The debugging command line parser parses the input from the debugging prompt during the debugging of an SPDL process. The debugging functions 608 manage the various functions required for debugging.

As previously described, SPDL is made up of both structure and content elements. The structure elements are processed after being parsed by structure processor parser 606. When the structure processor parser 606 encounters a content element, content processor parser 602 parses the content. All parsing functions performed by the present invention can be performed utilizing known conventional parsing mechanisms. The debugger of the present invention is called when either the structure parser or content parser encounters a new line control character such as a line feed or a line feed with a carriage return. When a user enters a debugging command at the debugging prompt, the debugging command line parser 604 calls the debugging functions 608. The output from the system including the processed document and the debugging results including system parameters can be displayed or printed at output 610. When the document is processed, it is processed for presentation to a user by a presentation device such as any type of printer, facsimile device or display such as a CRT or LCD. The debugging results and/or the processed document can be displayed by the presentation device.

The debugging functions 608 call different processes and examine the system parameters to indicate to the user the desired information. The information which may be desired by the users can be found in the context stack dictionaries 612, the operand stack 616, the machine state 618, and from other elements stored within the prologue or CCI data structure 620. The data illustrated in FIG. 15 corresponds to the data structures illustrated in FIG. 4.

Important debugging functions are those pertaining to break points. A user may desire to set the point at which processing is to stop or delete break points. These routines are stored in the break points table management routines 616 which utilize the break point table 622.

FIG. 16 illustrates an exemplary operation of the present invention. As the present invention calls the debugger after each new line control character, after line#1, the debug prompt is displayed. Note that line#1 is illustrated as two lines because of space constraints and there is not a new line control character after DTD but the information after DTD wraps onto the next line.

After the display of the debug prompt, the user enters the command "set at 10". The system then indicates that there has been a first break point set at line 10. The user of the system subsequently adds break points at lines 5 and 15 in a similar manner. After entering the break point for line 15, at the debug prompt, the user enters the command "display break point table" and the three break points which were input are then displayed.

After displaying the break point table, the user types "go" which causes the SPDL document to be processed up until the first break point at line 5. After line 5, the debug prompt is displayed and the user has the option to request the display of any of the system parameters or enter a debugging system function command. However, the user types the command "go" and therefore, the system processes lines 6–10 and displays the debugged prompt after processing of line 10. At the debug prompt, the user again types "go" and lines 11–15 are executed.

Figure 17:
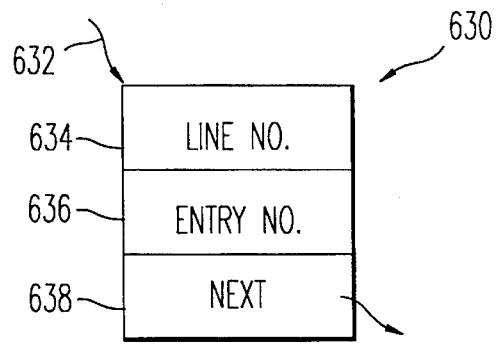
FIG. 17 illustrates the break point linked list data structure.

FIG. 17 illustrates the break point linked list data structure 630 which is used to keep track of the break points entered by a user. The break point linked list data structure is pointed to by a pointer 632. The data structure has three entries; the line number 634 indicating which line the break point is set at, the entry number 636 indicating what number break point this is, and a pointer 638 which points to a next break point linked list or if there are no subsequent break point linked lists, pointer 638 points to null.

Figure 18:
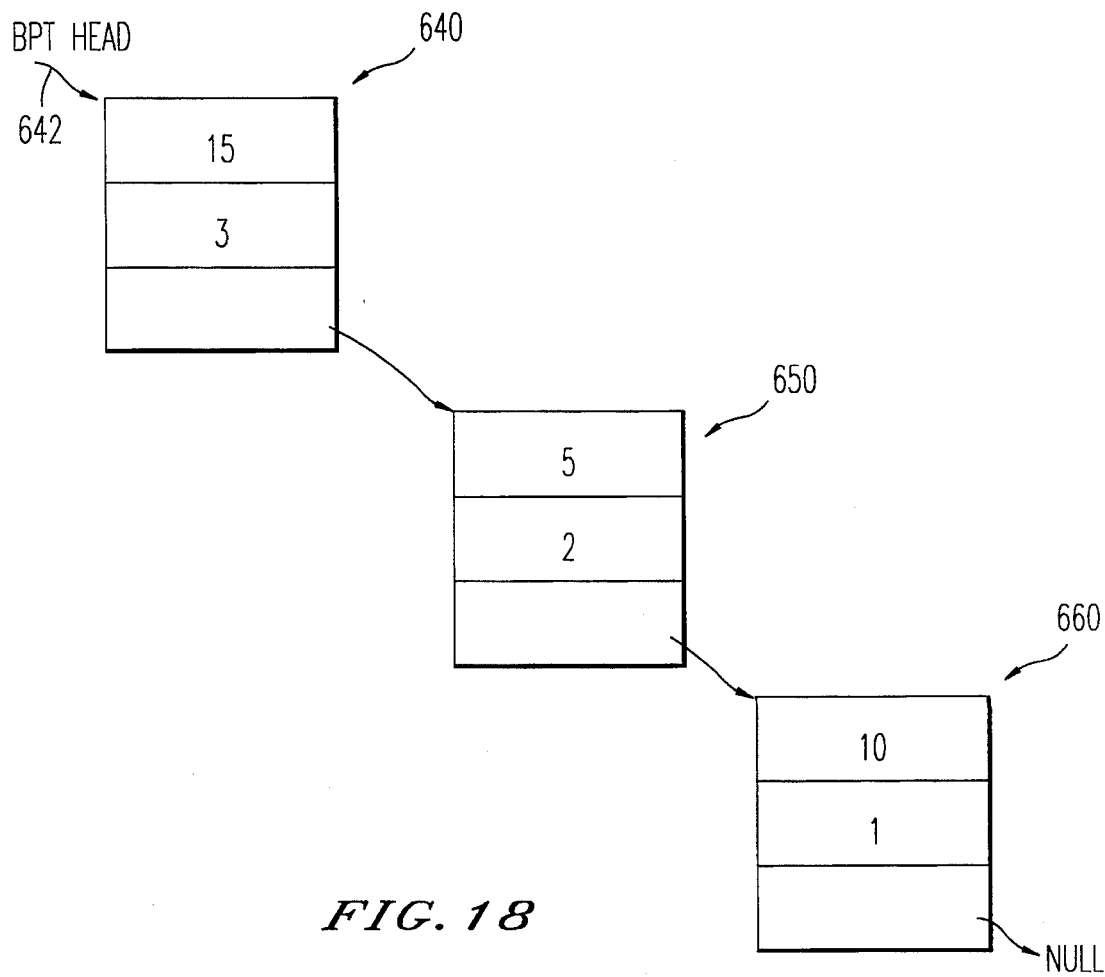
FIG. 18 illustrates a series of break point linked list data structures used when processing the example of FIG. 16.

FIG. 18 illustrates a series of break point linked list data structures which correspond to the processing performed in the example illustrated in FIG. 16. Pointer 642 is the break point head pointer and always points to the most recently entered break point linked list. Break point head pointer 642 points to break point linked list 640 which indicates a break point is set at line number 15 and that it is break point number 3. Break point linked list 640 points to break point linked list 650 which indicates a break point is set at line 5 and is the second break point which has been entered. Break point linked list 650 points to break point 660 which indicates a break point is set at line 10 and this break point is the first break point.

Before a detailed description of the processing performed by some of the debugging commands is given, a brief description of the various debugging commands of the present invention will now be given in connection with Table 1.

TABLE 1

| DEBUGGING COMMANDS | |
|---|---|
| System Functions | Display Functions |
| SET AT <d> | DISPLAY OPERAND STACK |
| DELETE <d> | DISPLAY CONTEXT STACK |
| DISPLAY BREAK POINT TABLE | DISPLAY <name> |
| GO | DISPLAY DICTIONARY <name> |
| STEP | DISPLAY STATE VARIABLES |
| EXECUTE <N> | DISPLAY DEFINED RESOURCES |
| QUIT | DISPLAY DECLARED RESOURCES |
| | PRINT <key> IN <dictionary> |
| | DISPLAY STRUCTURE LEVEL |

A brief description of the debugging commands will now be given. The SET AT command is used to set a break point at a particular line. The DELETE command is used to delete a specific break point number. The DISPLAY BREAK POINT TABLE displays all of the break points which have been set. The GO command causes processing of the SPDL document until a break point is encountered. The STEP command causes a single step tracing of the processing of the SPDL document. This is the default mode for the present invention and after the first line of a document is processed when the debugger is active, the debug prompt will be displayed, as illustrated in FIG. 16. The EXECUTE <N> command is used to process N lines of the SPDL document before the debug prompt is displayed. The QUIT command is used to exit the debugger.

Regarding the debugging display functions, the DISPLAY OPERAND STACK command displays all of the objects which have been pushed onto the operand stack. The DISPLAY CONTEXT STACK command displays the names of all dictionaries on the context stack if the names are available. Otherwise "-dictionary-" is shown. If no dictionaries are on the context stack, a context stack empty message is displayed. The DISPLAY <name> command is used to display a value in a dictionary of the context stack which corresponds to an input key. If a key is not found in the dictionary, a warning message is displayed. The DISPLAY DICTIONARY command displays all <key, value> pairs in a particular dictionary. The DISPLAY STATE VARIABLES command displays the state variables in the current context of interpretation. The DISPLAY DEFINED RESOURCES command shows the resources which have been defined. The DISPLAY DECLARED RESOURCES command shows the resources which have been defined in a resource definition and declared by a resource declaration. The PRINT VALUE IN DICTIONARY command takes the input key and dictionary name and displays the value corresponding thereto. The DISPLAY STRUCTURE LEVEL COMMAND shows the pageset level and the picture level of the pageset/picture stack.

Figure 19:
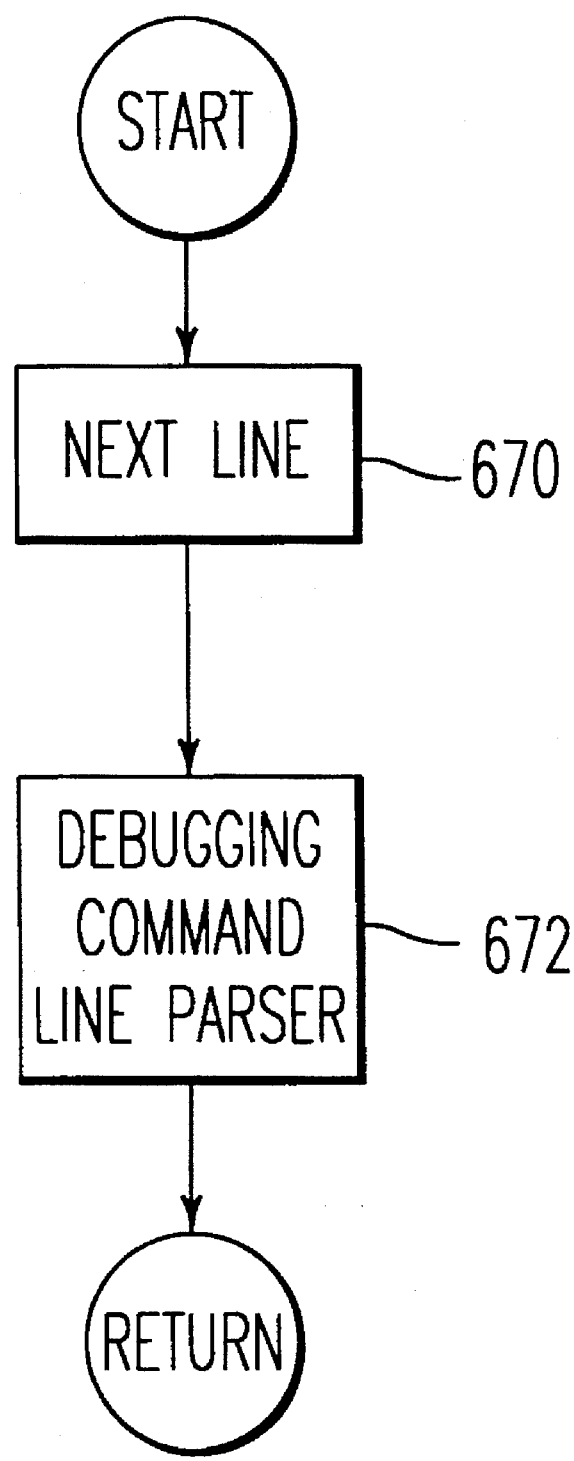
FIG. 19 illustrates the processing for the "single step" debugging command.

Turning now to FIGS. 19–23 to the flowcharts illustrating the process performed while executing the system function commands, FIG. 19 illustrates a flowchart for single step processing. Step 670 processes the next line in the SPDL file and step 672 then returns control to the debugging command line parser. At step 672, the debugging prompt is displayed and the user can enter any of the debugging commands.

Figure 20:
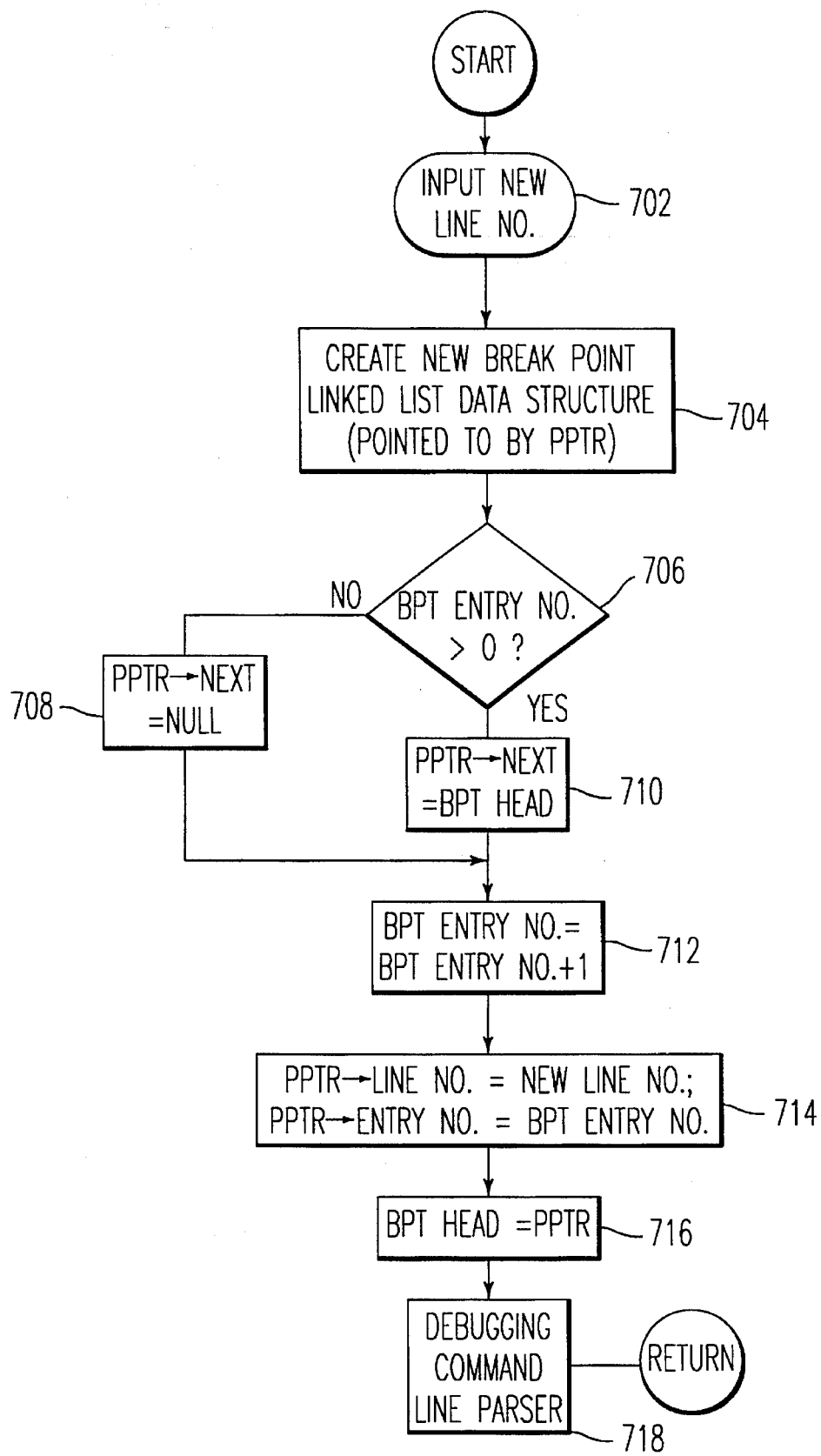
FIG. 20 illustrates the processing for the "set break point" debugging command.

FIG. 20 illustrates the processing performed when a SET BREAK POINT command is entered. In step 702, the new line number for the break point is input. Step 704 creates a new break point linked list data structure which is pointed to by the pointer PPTR. The variable BPT ENTRY NO is a global variable which indicates how many break points have been set. This variable is initialized to zero when the system is initialized or turned on. Step 706 determines if BPT ENTRY NO. is greater than zero. If it is not, no other break points have been set and therefore the "next" entry in the newly created break point linked list data structure is set equal to null in step 708. If step 706 determines that BPT ENTRY NO. is greater than zero, at least one break point has already been set and therefore, the "next" pointer of the newly created break point linked list data structure is set to point to the previous break point head pointer. Step 712 then increments the variable BPT ENTRY NO by one as a new break point has been entered.

Step 714 then sets the line number entry in the newly created break point linked list data structure to be equal to the input new line number. Step 714 also sets the entry number of the newly created break point linked list data structure equal to the variable BPT ENTRY NO. Step 716 then sets the break point head pointer equal to the pointer which points to the newly created break point linked list data structure, thereby inserting the newly created break point list data structure as the first data structure pointed to by the break point head pointer. Step 718 then returns control to the debugging command line parser.

Figure 21:
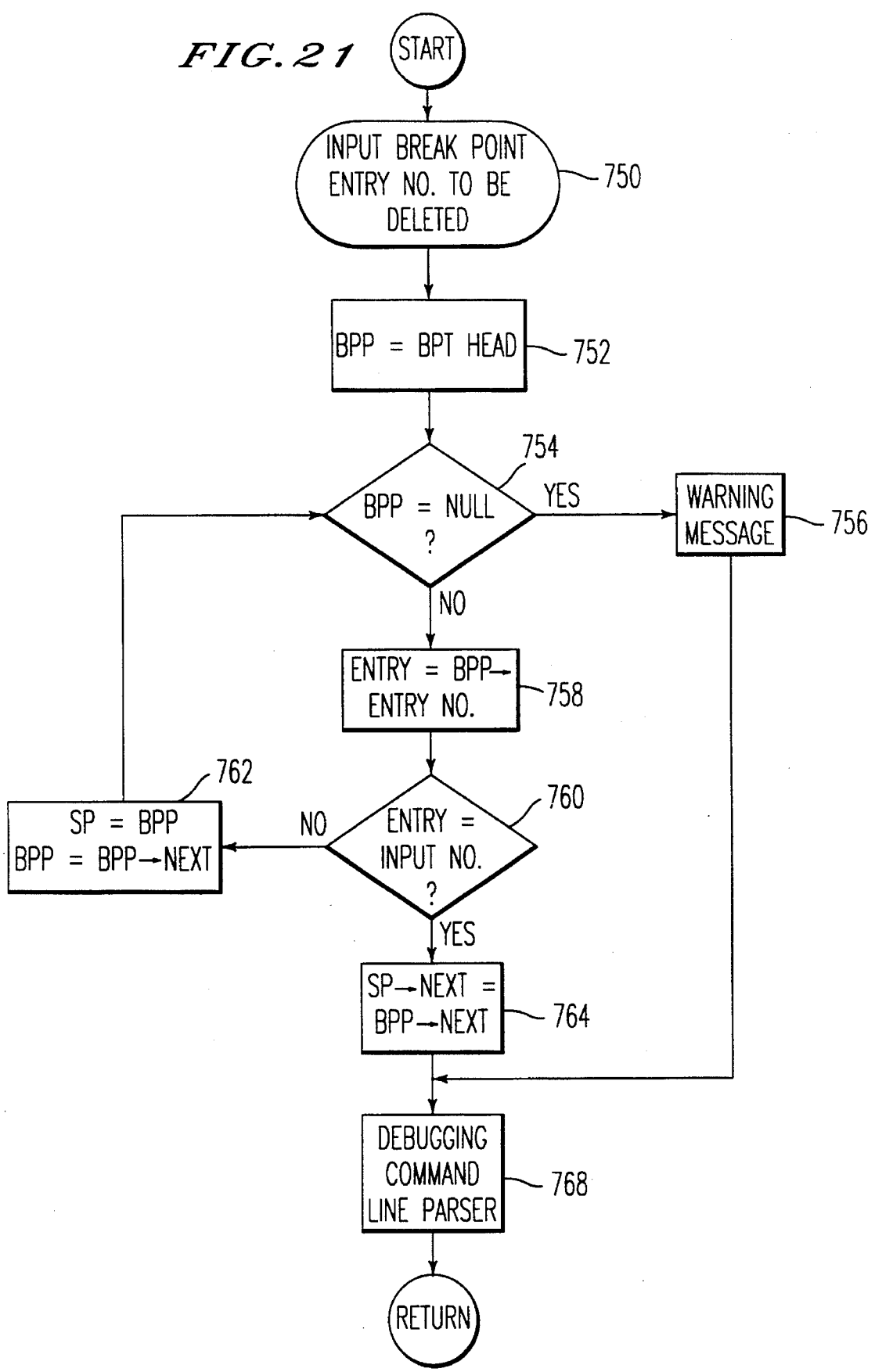
FIG. 21 illustrates the processing for the "delete break point" processing command.

FIG. 21 illustrates the processing performed for a DELETE BREAK POINT command. In FIG. 21, step 750 inputs the break point entry number which is to be deleted. Step 752 then sets the temporary pointer BPP equal to the current break point head pointer. Steps 754–762 are then executed to trace through the break point linked list to find the specific break point linked list having an entry number which corresponds to the input break point entry number. Step 754 determines if BPP is equal to null. If it is, there are either no break point linked list data structures or each of the break point linked list data structures have been searched and there are no break point linked list data structures having an entry number which corresponds to the input entry number. Step 758 sets the temporary variable ENTRY equal to the entry number in the linked list data structure pointed to by BPP. Step 760 then determines if ENTRY is equal to the input break point number. If it is not, flow proceeds to step 762 where the subsequent or previous linked list SP is set to be the current linked list BPP, and BPP is then set equal to the "next" entry of the data structure currently pointed to by BPP, effectively advancing the subsequent and current linked lists by one. If step 760 determines that ENTRY is equal to the input break point number, the break point linked list corresponding to the input break point entry number has been found and flow proceeds to step 764.

Step 764 sets the "next" entry of the previous break point linked list which currently points to the data structure for the break point which is to be deleted to point to the data structure which the pointer in the "next" entry of the break point linked list data structure which is to be deleted points. For an example of what is being accomplished by step 764, turn back to FIG. 18 and assume that BPP is linked list 650 and the break point to be deleted is number 2. Step 760 will determine that the entry number 2 in linked list 650 is equal to the input break point entry number which is to be deleted and flow proceeds to step 764 which sets the "next" pointer in break point linked list data structure 640 to point to break point linked list 660 because the next entry in break point linked list 650 points to break point linked list 660. In this manner, the break point linked list 650 is removed from the break point linked lists. Of course, since the break point linked list 650 is no longer used, it is possible to free up the memory corresponding to break point linked list 650 by deleting linked list 650.

From the warning message display step 756 which is displayed when no break point linked lists are found having the input break point entry number to be deleted, and step 764, flow proceeds to step 768 which returns control to the debugging command line parser.

Note that when the break point to be deleted is in the break point linked list pointed to by BPT HEAD, step 764 will set BPT HEAD to equal the NEXT pointer of BPP because there is no subsequent break point linked list data structure corresponding to SP.

Figure 22:
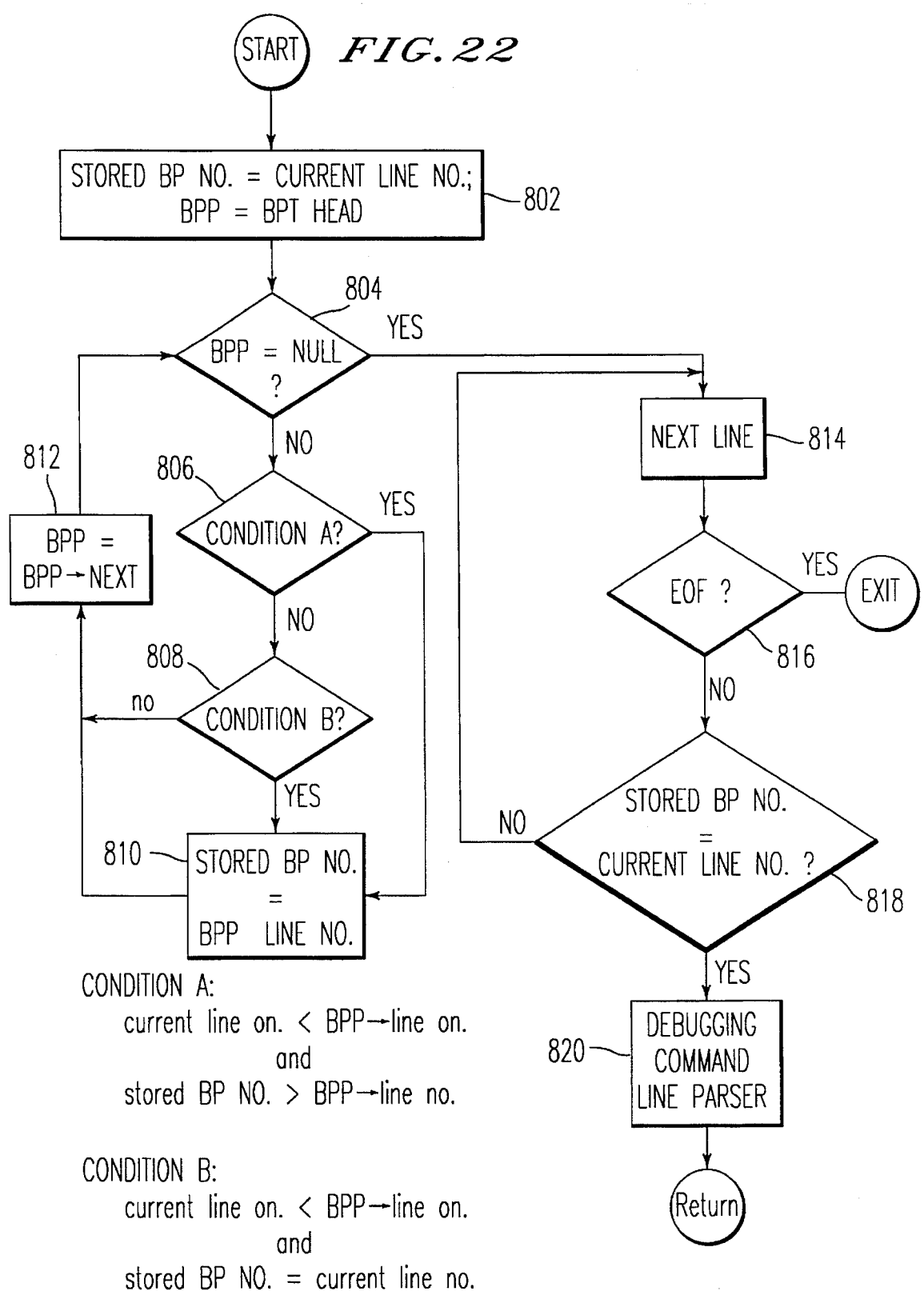
FIG. 22 illustrates the processing for the "go until break point" processing command.

FIG. 22 illustrates the processing for the GO UNTIL BREAK POINT command. The purpose of this command is to process lines of the SPDL document until a break point is encountered. While the overall GO UNTIL BREAK POINT processing may appear to be quite simple when observing the operation, it is to be noted that steps 804–812 make the process more than trivial because the line numbers in the break point linked list data structures are not stored in any particular order and it is necessary to perform steps 804–812 to find the next break point after the current line number.

In the process illustrated in FIG. 22, step 802 sets the variable STORED BP NO equal to the CURRENT LINE NO (i.e., the line number of the last line processed before the debug prompt was displayed. Step 802 also sets the temporary pointer BPP equal to the head break point pointer. Step 804 determines if BPP is equal to null. If it is, either no break points have been set or all break points have been processed in steps 804–812 to find the next break point after the current line number. If BPP is determined not to be null, step 806 determines if the CURRENT LINE NO is less than the line number in the break point linked list pointed to by BPP and the STORED BP NO is greater than the line number in the break point linked list pointed to by BPP. If it is, flow proceeds to step 810 and if not, flow proceeds to step 808. Step 808 checks to determine if the CURRENT LINE NO is less than the line number in the break point linked list pointed to by BPP and the STORED BP NO is equal to the CURRENT LINE NO. If the query in step 808 is affirmative or the query in step 806 is affirmative, flow proceeds to step 810 where the variable STORED BP NO is set equal to the line number in the break point linked list pointed to by BPP. From step 810 or a negative answer in step 808, BPP is set equal to the next pointer in the break point linked list currently pointed to by BPP in step 812 so that the other break point linked lists can be checked. Once all break point linked lists have been checked, flow proceeds from step 804 to step 814.

Steps 814, 816, and 818 process the SPDL document until the break point line number which is being determined in steps 804–812 is encountered. Step 814 processes the next line of the SPDL document. Step 816 determines if the line is the end of file and if it is, the process of FIG. 22 is exited. If it is not, step 818 determines if the stored break point number is equal to the current line number and if it is, the break point has been reached, processing of the document stops, and control returns to the debugging command line parser in step 820. If in step 818 the query is negative, flow proceeds back to step 814 where the next line of the SPDL document is processed.

Figure 23:
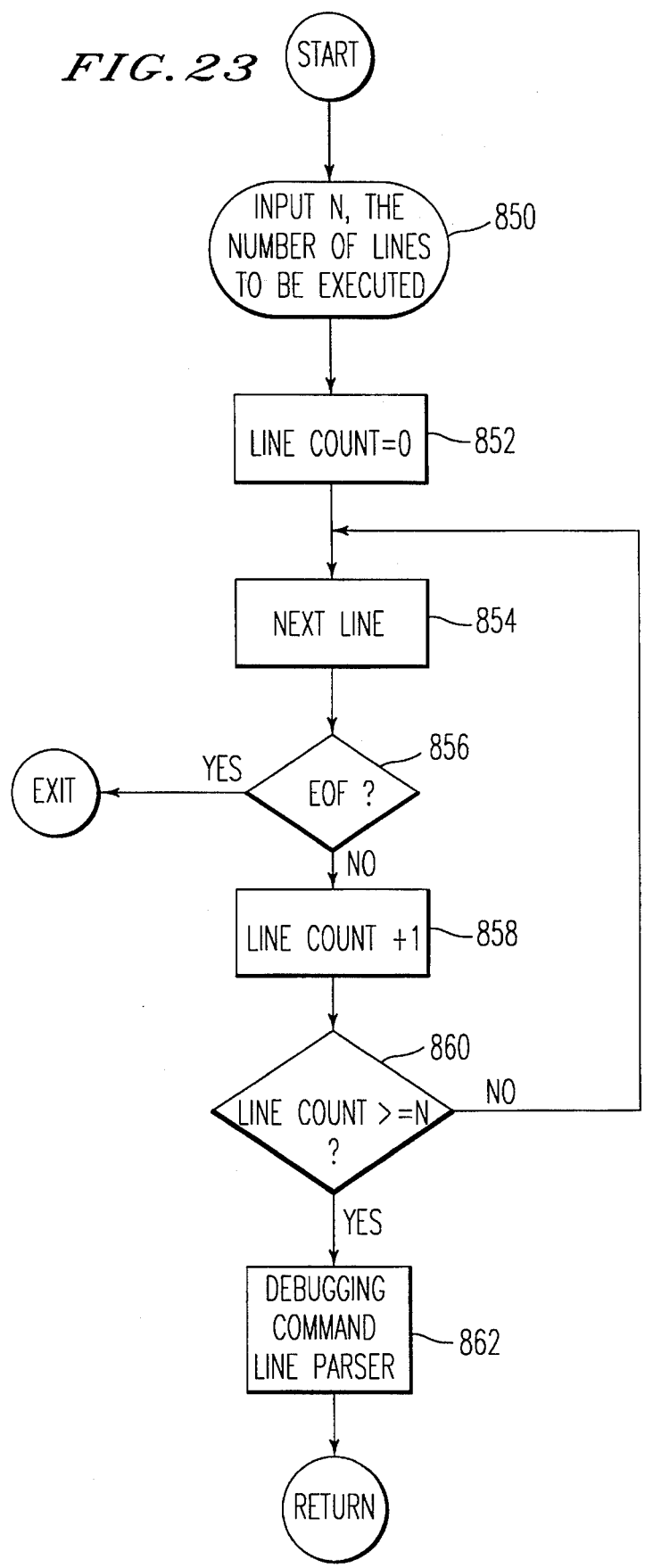
FIG. 23 illustrates the processing for the "execute N lines" processing command.

FIG. 23 illustrates the process performed during the EXECUTE N LINES command. Step 850 inputs N which is the number of lines to be executed. Step 852 then sets the line counter LINE COUNT equal to 0. Step 854 then processes the next line in the SPDL document. Step 856 determines if the end of the file has been reached and if it has, the process is exited. If the end of the file has not been reached, step 858 increments LINE COUNT by one. Step 860 then determines if LINE COUNT is greater than or equal to N. If it is not, more lines are to be processed and flow proceeds back to step 854. If step 860 determines that LINE COUNT is greater than or equal to N, N lines have been executed and therefore, control returns to the debugging command line parser in step 862.

The processing performed for each of the display functions of the debugger displays the data corresponding to the topmost entry on the picture/pageset stack 202 illustrated in FIG. 4. For example, if the DISPLAY DEFINED RESOURCES DEBUGGING command is entered, entry 204 on the picture/pageset stack would be examined and the pointer to prologue data structure 206 would be traced to the picture/pageset prologue data structure 220. The pointer to resource definition 225 in the picture/pageset prologue data structure 220 would be examined and traced to the linked list data structure pointed to by the pointer to resource definition 225. The linked list data structures pointed to by the pointer to resource definition 225 could then be traced in a known manner to determine the necessary information which has been requested. This information would then be displayed in a known manner. In a similar manner, all of the display function debugging commands of the present invention would use the information illustrated in FIG. 4 and the data structures corresponding to the pointers and entries in the prologue data structure 220 and the CCI data structure 240.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for implementation in a computer of processing and debugging a hierarchically structured document, comprising the steps of:

setting a break point at a line of the document;

creating a data structure for keeping track of hierarchical levels of the document;

inputting an element indicating a beginning of a first hierarchical level of the document;

creating a plurality of references for an entry A in said data structure for keeping track of hierarchical levels, said plurality of references for the entry A being used to keep track of information of the first hierarchical level of the document including references used for keeping track of at least one of defined resources, declared resources, and dictionaries which are used during processing of the document;

inputting an element at the first hierarchical level indicating that a first of said at least one of defined resources, declared resources, and dictionaries is to be used during processing of the document;

changing at least one of the references for the entry A used for keeping track of information to refer to said first of said at least one of defined resources, declared resources, and dictionaries;

inputting an element indicating a beginning of a second hierarchical level of the document which is below the first hierarchical level in the hierarchical structure of the document;

creating a plurality of references for an entry B in said data structure for keeping track of hierarchical levels, the entry B being different from the entry A in said data structure for keeping track of hierarchical levels, said plurality of references for the entry B being used to keep track of information of the second hierarchical level of the document including references used for keeping track of at least one of defined resources, declared resources, and dictionaries which are used during processing of the document;

inputting an element at the second hierarchical level indicating that a second of said at least one of defined resources, declared resources, and dictionaries is to be used during processing of the second hierarchical level, in addition to said first of said at least one of defined resources, declared resources, and dictionaries;

changing the reference used for keeping track of said at least one of defined resources, declared resources, and dictionaries for the entry B to refer first to said second of said at least one of defined resources, declared resources, and dictionaries and subsequently to said first of said at least one of defined resources, declared resources, and dictionaries;

accessing said at least one of defined resources,, declared resources, and dictionaries by using first the reference to the second of said at least one of defined resources, declared resources, and dictionaries and if a desired parameter is not found, using subsequently the subsequent reference to the second of said at least one of defined resources, declared resources, and dictionaries, without referring to said plurality of references for the entry A;

suspending processing of the document when said break point is processed;

inputting a debugging command after processing has been suspended; and processing said debugging command.

2. A method according to claim 1, wherein said step of setting a break point includes:

inputting a line number from a user indicating where a break is to occur.

3. A method according to claim 1, further comprising the step of:

inputting a command which indicates that said break point is to be deleted.

4. A method according to claim 1, wherein:

said inputting step includes inputting a command to display a structure level of the document.

5. A method according to claim 1, wherein:

said inputting step includes inputting a command to display at least one of an operand stack and a context stack.

6. A method according to claim 1, wherein:

said inputting step includes inputting a command to display at least one of a dictionary and a key in the dictionary.

7. A method according to claim 1, wherein:

said inputting step includes inputting a command to display a state variable table.

8. A method according to claim 1, wherein:

said inputting step includes inputting a command to display at least one of defined resources and declared resources.

9. An apparatus for processing and debugging a hierarchically structured document, comprising:

means for setting a break point at a line of the document;

means for creating a data structure for keeping track of hierarchical levels of the document;

means for inputting an element indicating a beginning of a first hierarchical level of the document;

means for creating a plurality of references for an entry A in said data structure for keeping track of hierarchical levels, said plurality of references for the entry A being used to keep track of information of the first hierarchical level of the document including references used for keeping track of at least one of defined resources, declared resources, and dictionaries which are used during processing of the document;

means for inputting an element at the first hierarchical level indicating that a first of said at least one of defined resources, declared resources, and dictionaries is to be used during processing of the document;

means for changing at least one of the references for the entry A used for keeping track of information to refer to said first of said at least one of defined resources, declared resources, and dictionaries;

means for inputting an element indicating a beginning of a second hierarchical level of the document which is below the first hierarchical level in the hierarchical structure of the document;

means for creating a plurality of references for an entry B in said data structure for keeping track of hierarchical levels, the entry B being different from the entry A in said data structure for keeping track of hierarchical levels, said plurality of references for the entry B being used to keep track of information of the second hierarchical level of the document including references used for keeping track of at least one of defined resources, declared resources, and dictionaries which are used during processing of the document;

means for inputting an element at the second hierarchical level indicating that a second of said at least one of defined resources, declared resources, and dictionaries is to be used during processing of the second hierarchical level, in addition to said first of said at least one of defined resources, declared resources, and dictionaries;

means for changing the reference used for keeping track of said at least one of defined resources, declared resources, and dictionaries for the entry B to refer first to said second of said at least one of defined resources, declared resources, and dictionaries and subsequently to said first of said at least one of defined resources, declared resources, and dictionaries;

means for accessing said at least one of defined resources,, declared resources, and dictionaries by using first the reference to the second of said at least one of defined resources, declared resources, and dictionaries and if a desired parameter is not found, using subsequently the subsequent reference to the second of said at least one of defined resources, declared resources, and dictionaries, without referring to said plurality of references for the entry A;

means for suspending processing of the document when said break point is processed;

means for inputting a debugging command after processing has been suspended; and means for processing said debugging command.

10. An apparatus according to claim 9, wherein said means for setting a break point includes:

means for inputting a line number from a user indicating where a break is to occur.

11. An apparatus according to claim 9, further comprising:

means for inputting a command which indicates that said break point is to be deleted.

12. An apparatus according to claim 9, wherein:

said means for inputting includes means for inputting a command to display a structure level of the document.

13. An apparatus according to claim 9, wherein:

said means for inputting includes means for inputting a command to display at least one of an operand stack and a context stack.

14. An apparatus according to claim 9, wherein:

said means for inputting includes means for inputting a command to display at least one of a dictionary and a key in the dictionary.

15. An apparatus according to claim 9, wherein:

said means for inputting includes means for inputting a command to display a state variable table.

16. An apparatus according to claim 9, wherein:

said inputting means for includes means for inputting a command to display at least one of defined resources and declared resources.

* * * * *

UNITED STATES PATENT AND TRADEMARK OFFICE
CERTIFICATE OF CORRECTION

PATENT NO. : 5,535,318
DATED : July 9, 1996
INVENTOR(S) : Tetsuro MOTOYAMA, ET AL.

It is certified that error appears in the above-indentified patent and that said Letters Patent is hereby corrected as shown below:

On the title page, Item [63], the part of Related U.S. Application Data is incomplete, should read:

-- [63] Continuation-in-part of Ser. No. 146,724, Nov. 2, 1993, Pat. No. 5,422,992, and a continuation-in-part of Ser. No. 119,930, Sep. 10, 1993, Pat. No. 5,446,837, each is a continuation-in-part of Ser. No. 87,571, Jul. 2, 1993, Pat. No. 5,499,329, which is a continuation-in-part of Ser. No. 931,808, Aug. 11, 1992, Pat. No. 5,416,896, which is a continuation-in-part of Ser. No. 876,601, Apr. 30, 1992, Pat. No. 5,319,748, and a continuation-in-part of Ser. No. 876,251, Apr. 30, 1992, Pat. No. 5,325,484. --

Signed and Sealed this

First Day of October, 1996

Attest:

BRUCE LEHMAN

*Attesting Officer*    *Commissioner of Patents and Trademarks*